United States Patent [19]
Ehrsam et al.

[11] 3,962,539
[45] June 8, 1976

[54] PRODUCT BLOCK CIPHER SYSTEM FOR DATA SECURITY

[75] Inventors: William Friedrich Ehrsam, Hurley; Carl H. W. Meyer, Kingston; Robert Lowell Powers, West Hurley; John Lynn Smith; Walter Leonard Tuchman, both of Woodstock, all of N.Y.

[73] Assignee: International Business Machines Corporation, Armonk, N.Y.

[22] Filed: Feb. 24, 1975

[21] Appl. No.: 552,684

[52] U.S. Cl.............................. 178/22; 340/172.5
[51] Int. Cl.² ...................... H04K 1/00; H04L 9/02
[58] Field of Search..................... 340/172.5; 178/22

[56] References Cited
UNITED STATES PATENTS

| | | | |
|---|---|---|---|
| 3,798,359 | 3/1974 | Feistel................................. | 178/22 |
| 3,798,360 | 3/1974 | Feistel................................. | 178/22 |

OTHER PUBLICATIONS

"Communication Theory of Secrecy Systems," Shannon, *Bell System Technical Journal*, vol. 28, pp. 656–715, 1949.

"Cryptography and Computer Privacy," Feistel, *Scientific American*, vol. 228, No. 5, pp. 15–23, 1973.

*Primary Examiner*—Howard A. Birmiel
*Attorney, Agent, or Firm*—Edwin Lester

[57] ABSTRACT

A device for ciphering a block of data bits under control of a cipher key. The cipher device performs a ciphering process for the block of data by carrying out an operation in which the block of data bits is first expanded by duplicating predetermined ones of the data bits. The data bits of the expanded block are combined by modulo-2 addition with an equal number of cipher key bits, selected in accordance with an arbitrary but fixed permutation, to produce a plurality of multi-bit segments forming the arguments for a plurality of different nonlinear substitution function boxes. The substitution boxes perform a plurality of nonlinear transformation functions to produce a substitution set of bits which are equal in number to the number of data bits in the first half of the message block. The substitution set of bits is then subjected to a linear transformation in accordance with an arbitrary but fixed permutation. The combined nonlinear transformation and linear transformation results in a product block cipher of the block of data.

10 Claims, 20 Drawing Figures

●ENCIPHER/DECIPHER DEVICE

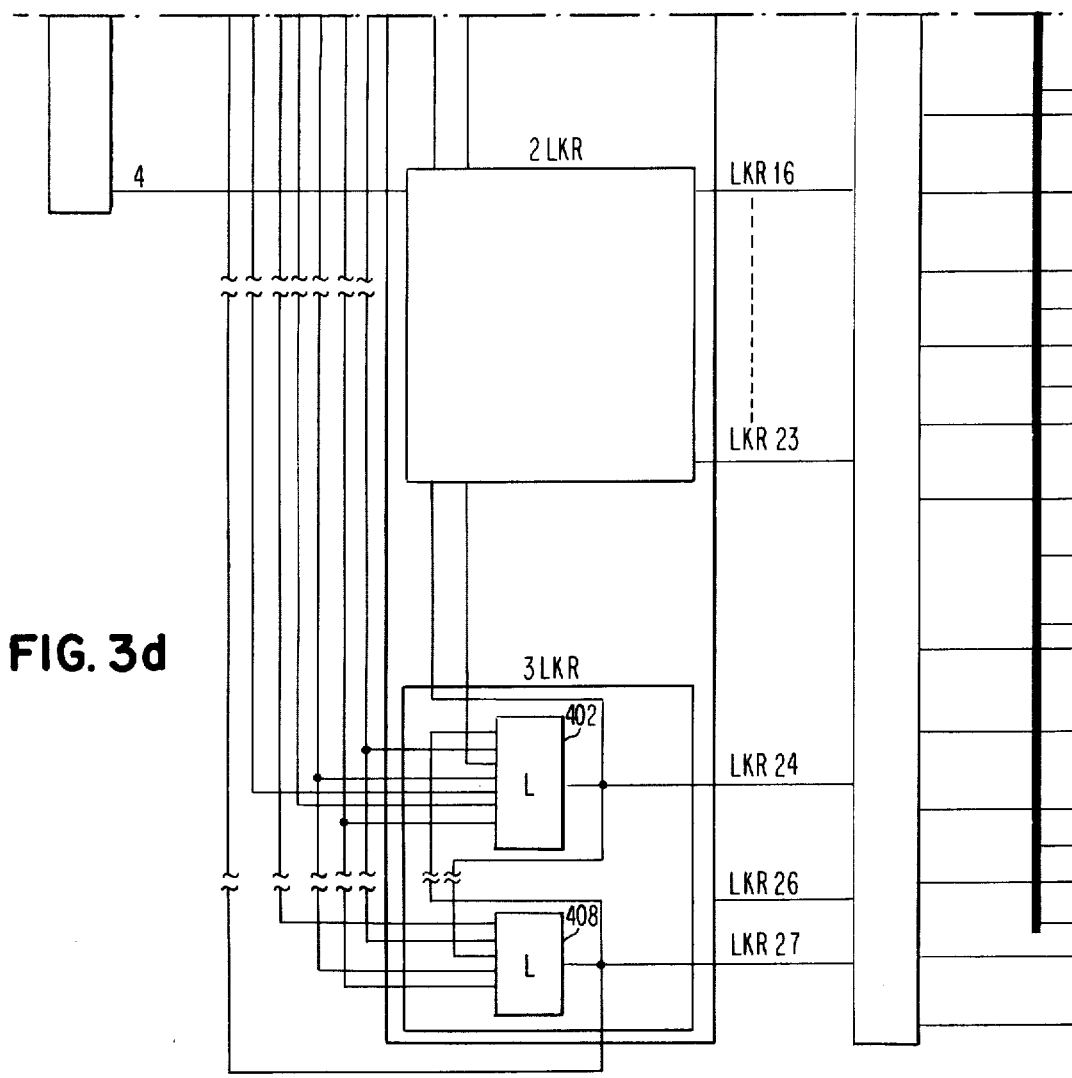
FIG. 3d
FIG. 3
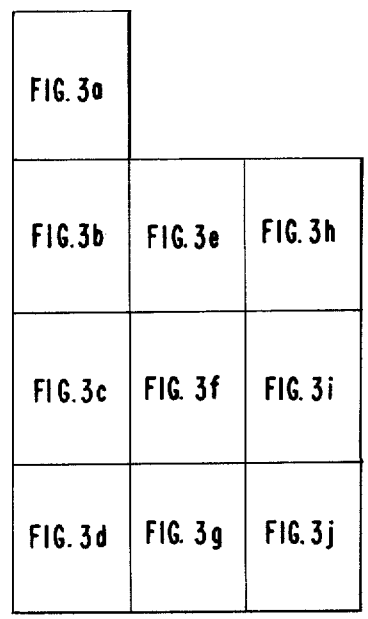

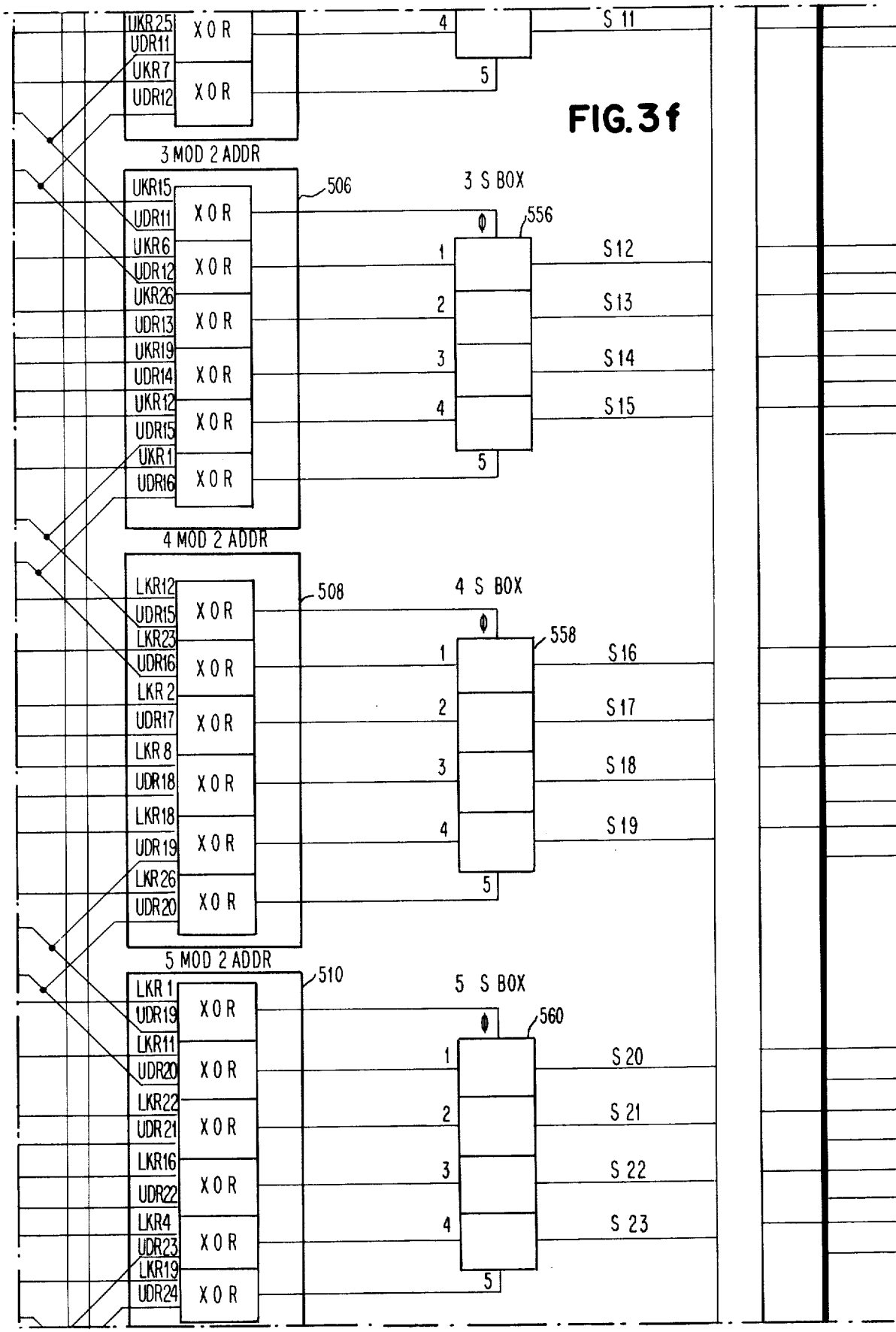

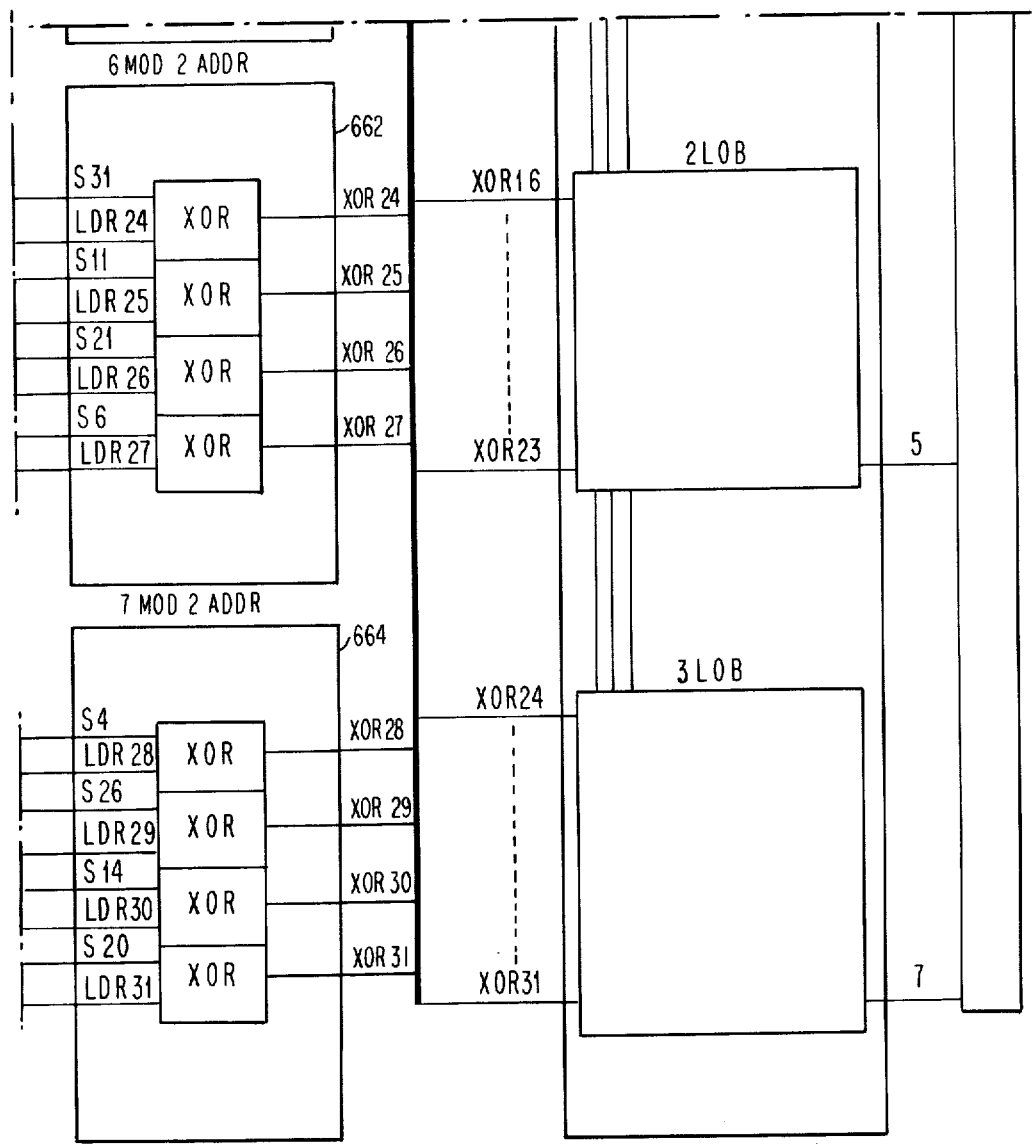
FIG. 3j
FIG. 7
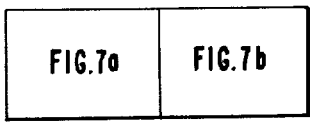

PRODUCT BLOCK CIPHER SYSTEM FOR DATA SECURITY

CROSS REFERENCE TO RELATED APPLICATION

Reference is hereby made to application Ser. No. 552,685 of W. F. Ehrsam et al filed concurrently herewith and entitled "Block Cipher System For Data Security" which utilizes the product block cipher arrangement of the present application to encipher or decipher message blocks of data and is assigned to the same assignee as the present application.

BACKGROUND OF THE INVENTION

This invention relates to a cipher device for utilization within a data processing environment and, more particularly, to a cipher device for performing a product block cipher process usable for enciphering and deciphering digital data to ensure complete security and privacy of data within a data processing environment.

With the increasing use of telecommunications in computer system networks, the very long cable connections between terminals or I/O devices and control units and the removability of storage media, there is an increasing concern over the interception or alteration of data because physical protection cannot normally be guaranteed. Cryptography has been recognized as one type of mechanism for achieving data security and privacy in that it protects the data itself rather than the medium of transmitting the data.

Various systems have been developed in the prior art for enciphering messages to maintain the security and privacy of data communications. One such system is the block cipher system, which is a substitution technique, in which the entire block is enciphered in accordance with a predetermined cipher key. The resulting substituted message is unintelligible ciphertext which cannot be understood without knowledge of the cipher key. An advantage of the substitution technique operating in accordance with a predetermined cipher key is that the deciphering operation is easily implemented by a reverse application of the cipher key. Further teachings on the design and principles of substitution techniques may be found in "Communication Theory of Secrecy Systems" by C. E. Shannon, Bell System Technical Journal, Vol. 28, pages 656–715, Oct. 1949, and in "Cryptography and Computer Privacy" by H. Feistel, Scientific American, Vol. 228, No. 5, pages 15–23, May 1973. Both Shannon and Feistel expound on a product cipher system in which two or more ciphers are successively combined, as for example, by successive states of nonlinear substitution followed by linear transformation.

Various product ciphering systems have been developed in the prior art for improving the security and privacy of data within a data processing system. U.S. Pat. No. 3,798,359 issued Mar. 19, 1974 relates to a product cipher system which combines linear and nonlinear transformations of a cleartext message with the transformations being a function of a cipher key. In addition to controlling the transformation, the cipher key also controls various register substitutions and modulo-2 additions of partially ciphered data within the ciphering system. However, the system disclosed in this patent does not disclose any of the details of the precise mapping of cipher key bits by the key router to the modulo-2 adders, the details of the particular nonlinear transformation carried out internal to the substitution function boxes or the particular permutation carried out by the diffuser, all of which have a significant effect on the quality of the cipher operation. Also, the cipher key is divided into small groups with the cipher key bits within each group being shifted for each iteration of the cipher operation. Because the size of the group is small, the effect of each group of cipher key bits is restricted over a limited area of the cipher operation which also has a significant effect on the quality of the cipher operation. Additionally, only two types of substitution function boxes are used in this system selected as a function of a cipher key bit only which likewise has a significant effect on the quality of the cipher operation.

Related to this patent is U.S. Pat. No. 3,796,830 issued Mar. 12, 1974 which is also directed to a product cipher system in which the block of cleartext is processed on a segmented basis with each segment being serially transformed in accordance with a portion of the cipher key. However, the system disclosed in this patent is serial in nature which reduces throughput speed and if rearranged to a parallel block system would add significant complexity to the hardware implementation of such a system. Furthermore, this system like that of the related patent is limited to only two types of substitution function boxes selected as a function of a cipher key bit only which likewise has a significant effect on the quality of the cipher operation.

SUMMARY OF THE INVENTION

In the present invention, a cipher device is provided to cipher a 32-bit block of data under control of an arbitrarily chosen cipher key. The cipher device performs the cipher process by carrying out an operation in which the block of data, consisting of 32 data bits, considered as eight segments of 4 data bits each, is expanded into 48 data bits consisting of eight segments of 6 data bits each, the expansion being accomplished by duplicating the end data bits of each of the eight 4-bit segments. The expanded 48 data bits considered as eight 6-bit segments are then combined in parallel by modulo-2 addition with 48 cipher key bits considered as eight 6-bit cipher key bit segments, selected in accordance with an arbitrary but fixed permutation, with the resulting eight 6-bit segments forming the actual arguments for eight nonaffine transformation functions. In each of the eight transformation functions, the end bits of the applied 6-bit segment, resulting from the modulo-2 addition of a duplicated end bit of the proceding 6-bit data segment and a permuted cipher key bit and from the modulo-2 addition of a duplicated end bit of the succeeding 6-bit data segment and a different permuted cipher key bit, are effectively decoded to select one of four 16-entry function tables, each entry consisting of 4 bits. One of the 16 4-bit entries in the selected function table is then selected by effectively decoding the remaining inner 4-bits of the 6-bit segment. The function tables of the eight transformation functions are different from each other, thereby providing eight different transformation functions resulting in eight 4-bit segments defining a substitution set of 32 bits. The substitution set of 32 bits is then subjected to a linear transformation by an arbitrary but fixed permutation, the combined nonlinear transformation and linear transformation resulting in a product block cipher of the 32-bit block of data. The product block cipher operation described above may be used in an enciphering process carried out in a series of 16 iterations in accordance with a product block cipher algorithm, which may be defined in terms of a cipher function and a key schedule function. Thus, in the enciphering process, if the 64-bit input message block consists of a 32-bit block L and a 32-bit block R, then the input message block may be denoted by the term LR. Also, if the block of cipher key bits is chosen from a cipher key KEY, then the block of cipher key bits may be denoted by the term K. Therefore, for all iterations except the last, the output of an iteration with an input of LR may be denoted by the term L'R' and may be defined as follows:

$$L'=R \\ R'=L \oplus f(R,K)$$ (1)

where $\oplus$ denotes a bit-by-bit modulo-2 addition and before each iteration a different block K of cipher key bits is chosen from the cipher key KEY. Since the output is transposed after each iteration except the last, then the output of the last iteration with an input of LR may be denoted by the term L'R' and may be defined as follows:

$$L'=L+f(R,K) \\ R'=R$$ (2)

Additionally, if a key schedule KS is defined as a function of an integer $n$ in the range of 1 to 16 and the cipher key KEY, then the permuted selection of cipher key bits from the cipher key KEY may be denoted by the term $K_n$ and defined as follows:

$$K_n=KS(n,KEY)$$ (3)

Then, if $L_o$ and $R_o$ are L and R, respectively, and $L_n$ and $R_n$ are L' and R', respectively, when $L_{n-1}$ and $R_{n-1}$ are L and R, respectively, then the output of an iteration when $n$ is in the range from 1 to 15 may be defined by:

$$L_n=R_{n-1} \\ R_n=L_{n-1} \oplus f(R_{n-1},K_n)$$ (4)

Since the output is transposed after each iteration except the last, then the output of the last iteration when $n$ is equal to 16 may be defined by:

$$L_n=L_{n-1} \oplus f(R_{n-1},K_n) \\ R_n=R_{n-1}$$ (5)

In the enciphering process $K_1$ is used in the first iteration, $K_2$ in the second, and so on, with $K_{16}$ used in the 16th iteration. See FIG. 8 for a block diagram of such an enciphering process which makes use of the product block cipher algorithm of the present invention.

The cipher functions $f(R, K)$ may be defined in terms of primitive functions called selection functions and permutation functions. Thus, if a 32-bit block R is expanded to a 48-bit block, then the expanded block may be denoted by the term E(R). The expanded block E(R) is then combined by modulo-2 addition with a block of cipher key bits K, selected in accordance with an arbitrary but fixed permutation, to produce eight 6-bit segments, B1, B2, B3, B4, B5, B6, B7 and B8, forming the arguments for eight different distinct selection functions S1, S2, S3, S4, S5, S6, S7 and S8. Therefore, the modulo-2 addition may be defined as follows:

$$E(R) \oplus K=B1, B2, B3, B4, B5, B6, B7 \text{ and } B8.$$ (6)

Each distinct selection function $S_i$ transforms a distinct 6-bit segment $B_i$ into a 4-bit segment whereby the eight distinct selection functions may be defined as S1(B1), S2(B2), S3(B3), S4(B4), S5(B5), S6(B6), S7(B7) and S8(B8). The eight 4-bit segment outputs of the eight selection functions are then consolidated into a single 32-bit block which is permuted by a permutation function P into a new 32-bit block defined as follows:

$$P(S1(B1), S2(B2), S3(B3), S4(B4), S5(B5), \\ S6(B6), S7(B7), S8(B8))$$ (7)

which represents the cipher function $f(R, K)$.

The product block cipher operation of the present invention may also be used in a deciphering process carried out in a series of 16 iterations in accordance with a product block cipher algorithm which may also be defined in terms of a cipher function and key schedule function. Thus, if a 64-bit enciphered input message block consists of a 32-bit block L' and a 32-bit block R', then the enciphered input message block may be denoted by the term L'R'. Therefore, the output of the first iteration with an input of L'R' may be denoted after being transposed by the term LR and may be defined as follows:

$$L=L' \oplus f(R',K) \\ R=R'$$ (8)

where after each iteration a different block K of cipher key bits is chosen from the cipher key KEY in the reverse order in which it is chosen for the enciphering operation. After the first iteration, each succeeding iteration is transposed except the last, then the output of each succeeding iteration with an input of L'R' may be denoted by the term LR and may be defined as follows:

$$L=R' \oplus f(L',K) \\ R=L'$$ (9)

Then, if $L_n$ and $R_n$ are L and R, respectively, and $L_{n-1}$ and $R_{n-1}$ are L' and R', respectively, the output of the first iteration when $n$ is equal to 16 may be defined as follows:

$$L_{n-1}=L_n \oplus f(R_n,K_n) \\ R_{n-1}=R_n$$ (10)

Since the output is transposed after each iteration except the last, then the output of each succeeding iteration when $n$ is in the range from 15 to 1 may be defined as follows:

$$L_{n-1}=R_n \oplus f(L_n,K_n)$$ (11)

In the deciphering operation, $K_{16}$ is used in the first iteration, $K_{15}$ in the second, and so on, with $K_1$ used in the 16th iteration. See FIG. 8 for a block diagram of such a deciphering process which makes use of the product block cipher algorithm of the present invention.

Accordingly, it is an object of this invention to provide a cipher device for ciphering a block of data under control of a cipher key.

Another object of the invention is to provide a product block cipher process for ciphering digital data under control of a cipher key.

A further object of the invention is to provide a product block cipher process which includes a nonlinear transformation controlled in accordance with a cipher key and digital data.

Still another object of the invention is to provide a product block cipher process which includes a many to one nonlinear transformation.

Still a further object of the invention is to provide a product block cipher process in which a block of data bits to be ciphered is expanded by duplicating predetermined ones of the data bits and including a nonlinear transformation function controlled in accordance with a set of cipher key bits and a set of the data bits and duplicated data bits.

Still another object of the invention is to provide a product block cipher process in which a group of parallel segments of data bits to be ciphered are expanded by duplicating predetermined ones of the data bits in each segment and including a group of nonlinear transformation functions controlled in accordance with a group of parallel segments of a set of cipher key bits and the group of parallel segments of the data bits and the duplicated data bits.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a diagram of how FIGS. 3a through 3j may be placed to form a composite block diagram.

FIGS. 3a through 3j, taken together, comprise a detailed schematic diagram of the ciphering device of the present invention used in a ciphering process.

FIG. 7 illustrates how FIGS. 7a and 7b may be placed to form a composite timing diagram.

GENERAL DESCRIPTION OF THE DISCLOSED EMBODIMENT

Figure 1:
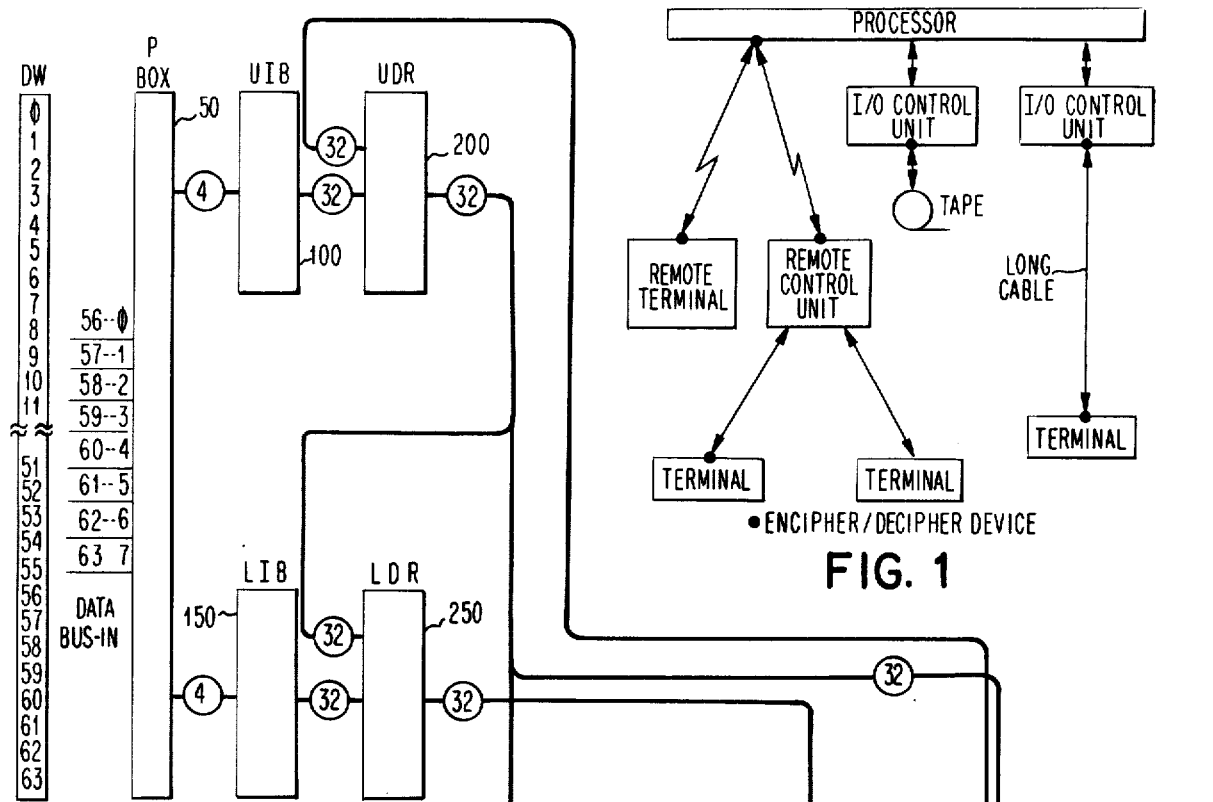
FIG. 1 is a block diagram illustrating the location of cipher devices in a data processing environment.

At various locations within a data processing network physical protection of the network cannot normally be guaranteed against the interception or alteration of data or the physical removal of storage media. This problem occurs most notably in the case where data is communicated between a processor and a remote control unit or a remote terminal via telecommunication or between a control unit and terminals or I/O devices via a very long cable connection or, where removable storage media is provided. One mechanism for achieving data security and privacy in those situations is by the use of cryptographic devices located at strategic locations within the network. At the sending station clear data may be enciphered by a cipher device operating in an enciphering mode and then transmitted to a receiving station where the enciphered data may be deciphered by a cipher device operating in a deciphering mode to obtain the original clear data. Likewise, when the functions of the receiving and sending stations are reversed, the functions of the cipher devices associated with the receiving and sending station will likewise be reversed so that clear data from the receiving station, now operating as the sending station, will be enciphered and transmitted to the sending station, now operating as the receiving station where it is deciphered back to the original clear data. FIG. 1 illustrates the location of such cipher devices in a representative data processing network.

Figure 2:
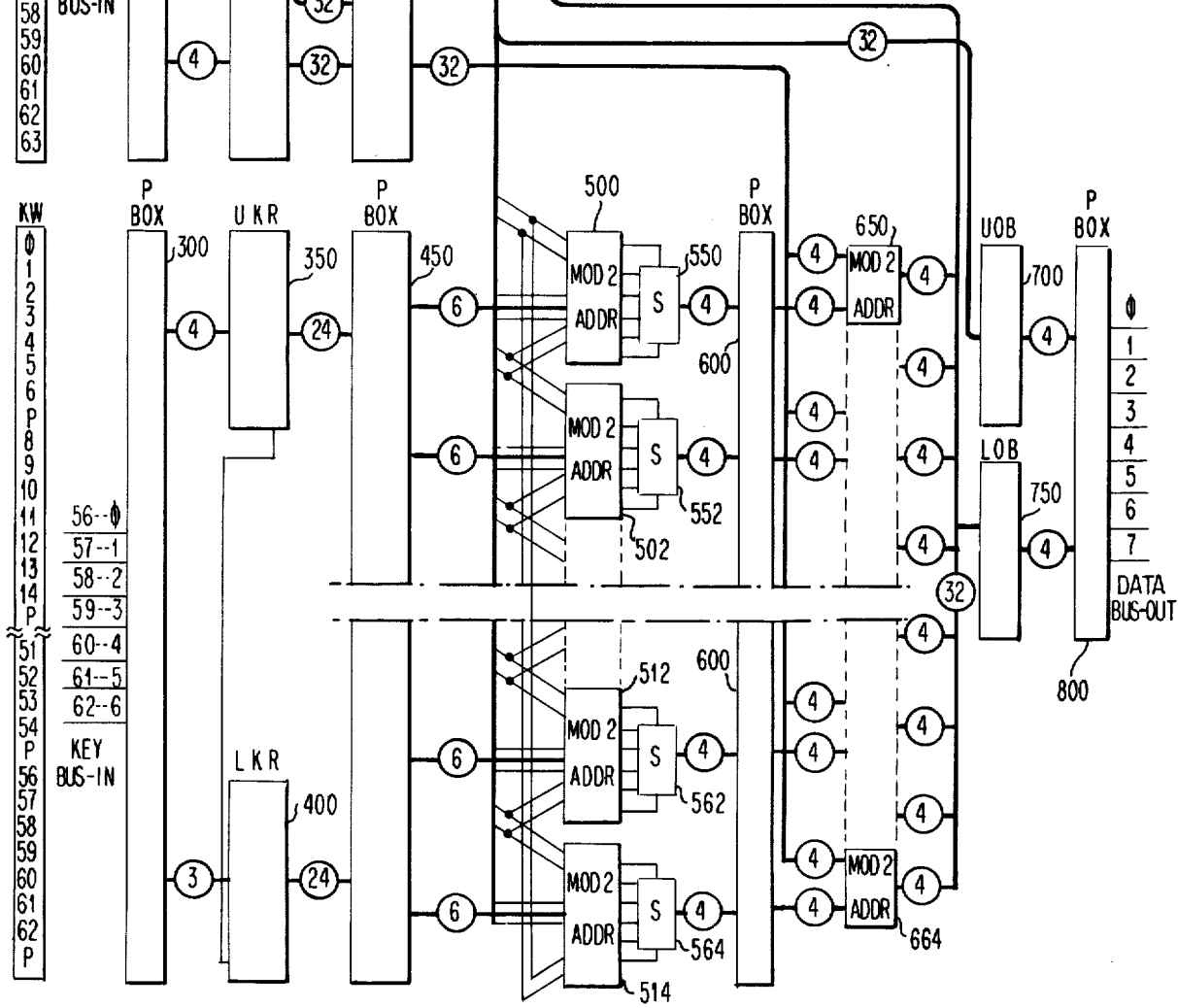
FIG. 2 is a block diagram of the cipher device of the present invention.

Referring now to FIG. 2, a block diagram of the cipher device is shown for enciphering or deciphering 64-bit message blocks of data consisting of 8 bytes with each byte containing 8 data bits. The data bytes of a message block are applied serially, a byte at a time, via the data bus-in to the cipher device, necessitating 8 cycles to completely transmit the message block of 64 data bits. Each byte of data bits received by the cipher device is subjected to an initial linear permutation accomplished by ordinary wire crossings hereinafter designated by a P box, e.g. P box 50. Following this, each permuted byte of data is divided into two halves with the even data bits 0, 2, 4 and 6 being applied to an upper input buffer (UIB) 100 and the odd data bits 1, 3, 5 and 7 being applied to a lower input buffer (LIB) 150. The UIB 100 and LIB 150 perform a serial to parallel conversion so that after reception of the 8 bytes of the message block the UIB 100 and the LIB 150 present two 32-bit halves of the message block in parallel to an upper data register (UDR) 200 and a lower data register (LDR) 250, respectively.

At the same time that the 64-bit message block is being received and buffered into the UIB 100 and the LIB 150, the cipher key is obtained from a 64-bit external register providing 8 bytes with each byte containing 7 Key bits and a parity bit used externally as a check bit. The cipher key bytes of the cipher key, with every eighth bit (the parity bit) omitted, are applied serially, a 7-bit byte at a time, via the key bus-in to the cipher device also necessitating eight cycles to completely transmit the cipher key. Each byte of the cipher key received by the cipher device is also subjected to an initial permutation by P box 300, after which each permuted byte of the cipher key is divided into two halves with the first 4 bits of each 7-bit byte being applied to an upper key register (UKR) 350 and the remaining 3 bits being applied to a lower key register (LKR) 400. The UKR 350 and LKR 400 each contain 28 stages with a connection from the last stage of the UKR 350 to the twenty-fifth stage of the LKR 400 and performs a serial to parallel conversion so that during the serial reception of the eight 7-bit bytes considered as seven groups of 8 bits each, three of the seven groups of the serially received 8 bits at stages 0, 8, and 16 of the UKR 350 and three other of the seven groups of the serially received 8 bits at stages 0, 8 and 16 of the LKR 400 are each converted to three parallel groups of 8 bits which may be considered as two parallel groups of 24 bits in the UKR 350 and the LKR 400. The remaining group of the seven groups of 8 bits is serially received at stage 24 of the UKR 350. The connection between the last stage of the UKR 350 and stage 24 of the LKR 400 permits the first 4 bits of the remaining group of 8 bits serially received by the UKR 350 to be passed to the LKR 400 so that during reception of the group of 8 bits, the first 4 bits are converted to a parallel subgroup of 4 bits in the last four stages of the LKR 400 and the second 4 bits are converted to a parallel subgroup of 4 bits in the last four stages of the UKR 350. The UKR 350 and the LKR 400 now contain the cipher key considered as two parallel groups of 28 bits each.

At this point, the first and second half of the message block are transferred to the UDR 200 and the LDR 250 and the cipher key is contained in the UKR 350 and LKR 400. Once the UKR 350 and LKR 400 are loaded, the connection between the two registers is no longer used and the UKR 350 and LKR 400 operate as two independent 28-bit shift registers. In an enciphering process, a series of 16 iterations is carried out, prior to which the cipher key contents of the UKR 350 and the LKR 400 are preshifted by one bit position. During the iteration operations of the enciphering process except the first the cipher key contents of UKR 350 and LKR 400 are shifted by one or two bit positions. This procedure assures proper alignment of the cipher key bits as each register is always shifted exactly 28 positions according to a predetermined shift schedule.

In the first iteration of the enciphering operation, the first half of the message block contained in the UDR 200, consisting of 32 data bits considered as eight segments of 4 data bits each, is expanded into 48 data bits consisting of eight segments of 6 data bits each, the expansion being accomplished by duplicating the end bits of each of the eight 4-bit segments. The expanded 48 data bits now considered as eight 6-bit segments are then applied, in parallel, to eight modulo-2 adders 500 to 514, each consisting of six exclusive OR's. At the same time, a selected set of 48 predetermined ones of the 56 cipher key bits, 24 selected from the UKR 350 and 24 from the LKR 400, are linearly permuted in P box 450 by a predetermined fixed permutation and applied as eight segments of 6 cipher key bits, in parallel, to the exclusive OR's of the eight modulo-2 adders 500 to 514. The eight modulo-2 adders 500 to 514 effectively combine the expanded 48 data bits, considered as eight 6-bit segments, in parallel, with the permuted 48 cipher key bits, considered as eight 6-bit segments, with the resulting eight 6-bit segments forming the actual arguments for eight nonaffine substitution function boxes 550 to 564 hereinafter designated as S boxes in each of which a nonlinear transformation function is carried out. In each S box the end bits of the applied 6-bit segment, resulting from the modulo-2 addition of a duplicated end bit of the preceding 6-bit data segment and a permuted cipher key bit and from the modulo-2 addition of a duplicated end bit of the succeeding 6-bit data segment and a different permuted cipher key bit, are effectively decoded to select one of four 16-entry function tables contained in a read only storage (ROS) within the S box, each entry consisting of 4 bits. One of the 16 4-bit entries in the selected function table is then selected by effectively decoding the remaining inner 4 bits of the applied 6-bit segment. The eight S boxes are different from each other, thereby providing eight different transformation functions resulting in eight 4-bit segments defining a substitution set of 32 bits. The substitution set of 32 bits is then subjected to a linear transformation by an arbitrary but fixed permutation in P box 600, the combined nonlinear transformation and linear transformation resulting in a 32-bit product block cipher of the first half of the message block which is applied to the modulo-2 adders 650 to 664. The 32 data bits of the second half of the message block in the LDR 250 are also applied to the modulo-2 adders 650 to 664 which then modifies the 32-bit second half of the message block from LDR 250 in accordance with the 32-bit product block cipher of the first half of the message block from the P box 600, the result of which is eight 4-bit groups comprising a new set of 32 bits representing a modified second half of the message block. The 32-bit modified second half of the message block is applied to replace the 32-bit first half of the message block contained in the UDR 200 which at the same time is transferred to replace the 32-bit second half of the message block presently contained in the LDR 250. During the next iteration of the enciphering operation, the cipher key presently stored in the UKR 350 and the LKR 400 is shifted in accordance with the predetermined shift schedule to provide a new permuted set of cipher key bits. The 32-bit modified second half of the message block presently stored in the UDR 200 is then used with the new set of permuted cipher key bits in a similar product block cipher operation, the result of which is used by the modulo-2 adders 650 to 654 to modify the 32-bit first half of the message block presently stored in the LDR 250. The 32-bit modified first half of the message block from the modulo-2 adders 650 to 664 is then applied to replace the 32-bit modified second half of the message block contained in UDR 200 which at the same time is transferred to replace the 32-bit first half of the message block presently contained in LDR 250. During each of the remaining iteration operations of the enciphering process except the last, the cipher key bits in UKR 360 and LKR 400 are shifted according to the predetermined shift schedule to provide a new set of permuted cipher key bits, a 32-bit modified half of the message block stored in LDR 250 is remodified according to a 32-bit product block cipher of the previously modified half of the message block stored in the UDR 200 and the resulting 32-bit remodified half of a message block from the modulo-2 adders 650 and 664 is applied to replace the previously modified 32-bit half of the message block contained in UDR 200 which at the same time is transferred to replace the contents of LDR 250. During the last iteration operation, the cipher key bits in UKR 350 and LKR 400 are shifted a last time according to the shift schedule to provide a last set of permuted cipher key bits and a last remodification of a 32-bit modified half of the message block stored in LDR 250 is performed according to a 32-bit product block cipher of the previously modified half of the message block stored in UDR 200 but the resulting 32-bit remodified half of the message block from the modulo-2 adders 650 to 664 and the 32-bit previously modified half of the message block stored in UDR 200 are not transposed and now constitute the 64-bit enciphered version of the original message block. After the sixteenth iteration, the 32-bit contents of the UDR 200 and the 32-bit output of the modulo-2 adders 650 to 664, representing the enciphered message block of data, are transferred to an upper output buffer (UOB) 700 and a lower output buffer (LOB) 750, respectively. The 64-bit enciphered block of data consisting of four 8-bit bytes of enciphered data stored in the UOB 700 and four 8-bit bytes of enciphered data stored in the LOB 750, is then subjected to a parallel to serial conversion on each 8-bit byte of enciphered data and applied, an 8-bit byte at a time, to a P box 800, necessitating eight cycles to completely transmit the 64-bit enciphered message block of data. Each byte of enciphered data is subjected to a final linear permutation to connect the enciphered data bits to the proper bit lines of the data bus-out for transmission to a receiving station.

At a receiving station, deciphering the 64-bit enciphered message block of data under control of the same cipher key is accomplished through the same series of 16 iterations. However, no preshift of the cipher key contents of UKR 350 and LKR 400 is performed, as in the enciphering process, prior to the deciphering process. During the iteration operations of the deciphering process except the first the cipher key contents of UKR 350 and LKR 400 are shifted according to a predetermined shift schedule by one or two bit positions, as in the enciphering process, but in a direction opposite to that in the enciphering process to reverse the enciphering process and undo every iteration that was carried out in the enciphering process to produce a resulting 64-bit message block which is identical to the original 64-bit message block. Additionally, the cipher key content of UKR 350 and LKR 400 is shifted 27 bit positions during the iteration operations of the deciphering process. Consequently, since UKR 350 and LKR 400 are 28-bit shift registers, at the end of the deciphering process, the cipher key content of UKR 350 and LKR 400 are postshifted by one more bit position. This permits the cipher key to be shifted a complete revolution through the UKR 350 and LKR 400 shift registers according to the predetermined shift schedule to assure proper alignment of the cipher key bits during each iteration of the deciphering process and in preparation for another deciphering process.

DETAILED DESCRIPTION OF DISCLOSED EMBODIMENT

Figure 7A:
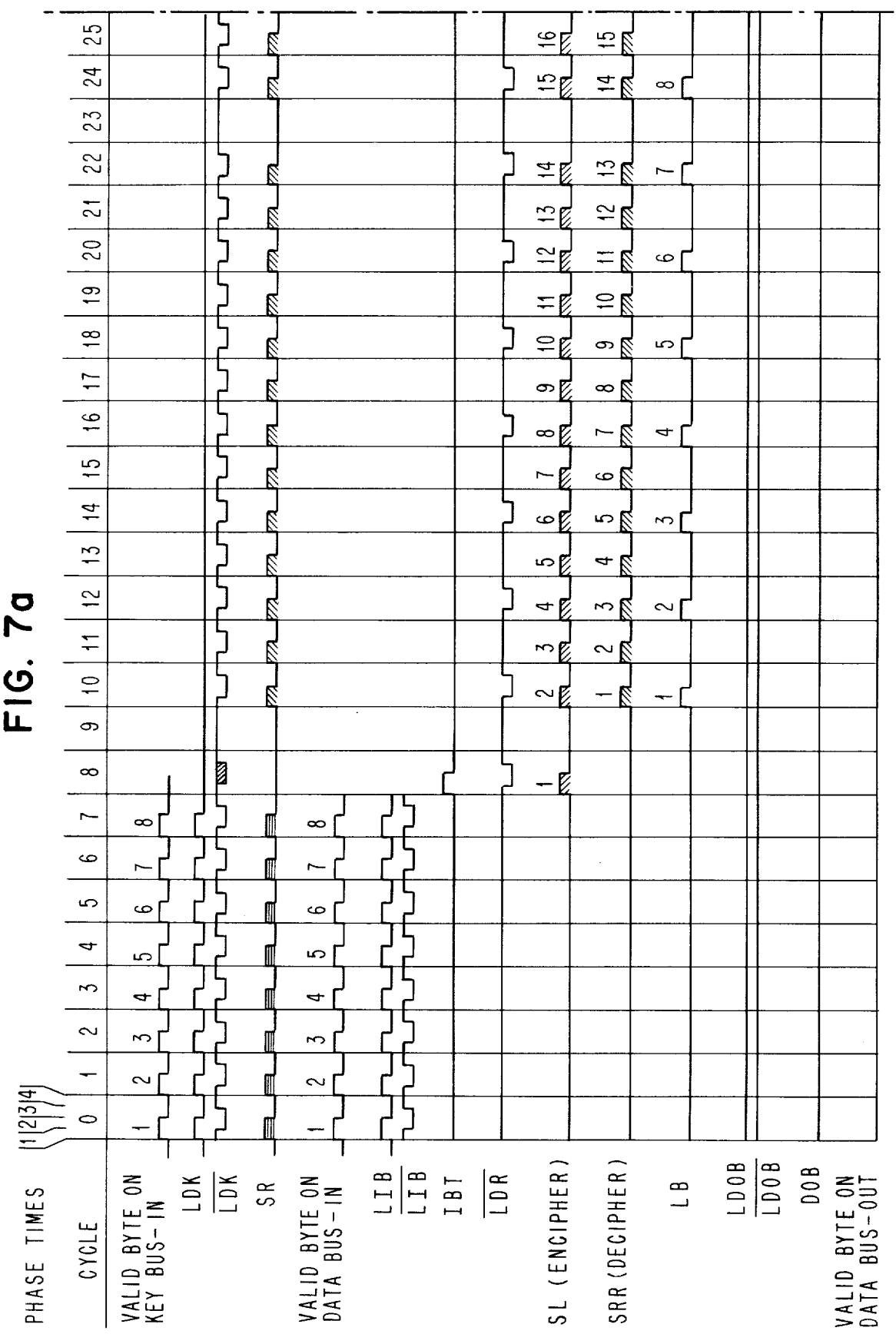
FIGS. 7a and 7b, taken together, comprise a timing diagram of an enciphering and deciphering process using the cipher device of the present invention.
Figure 7B:
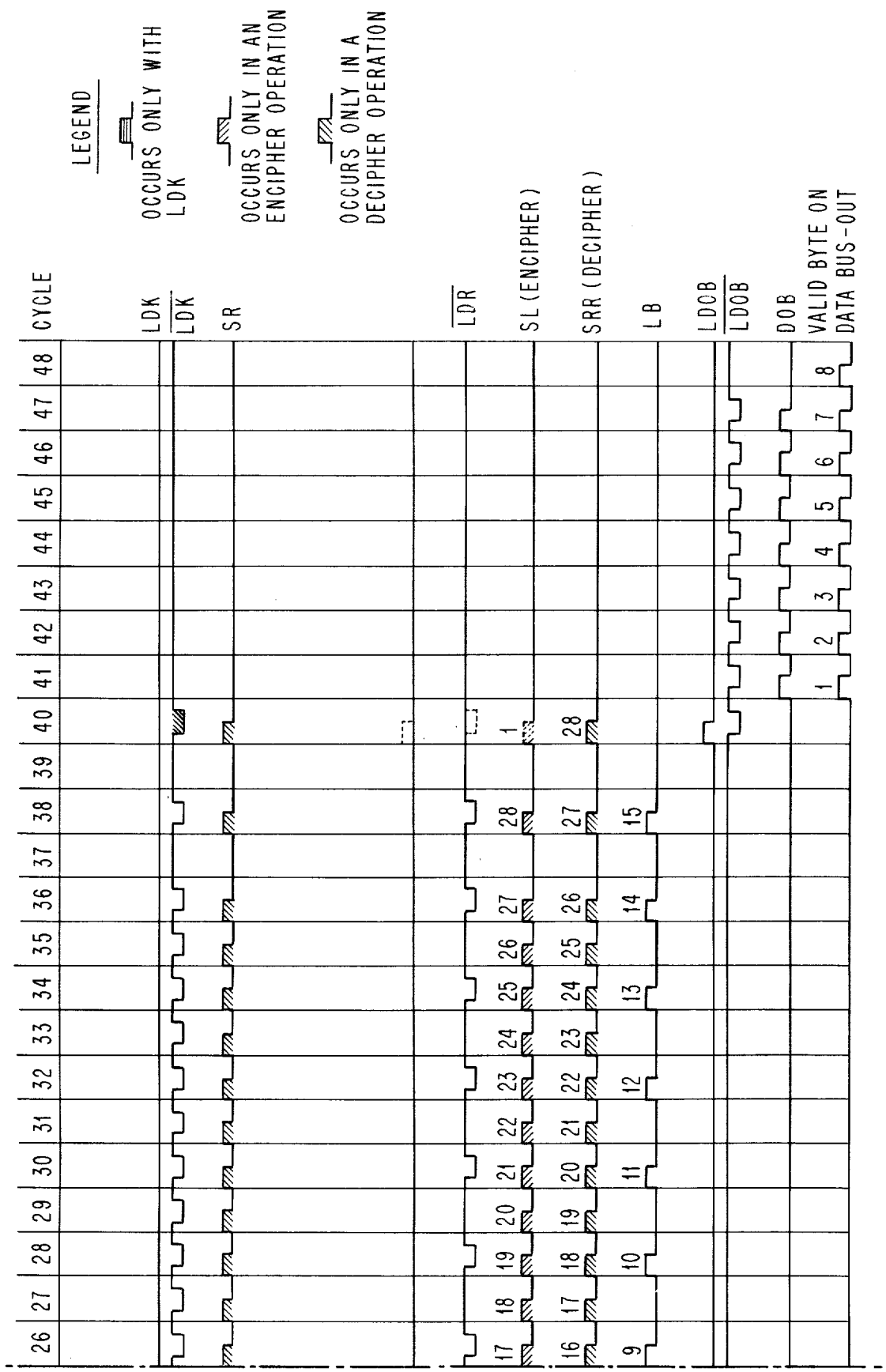
Figure 8:
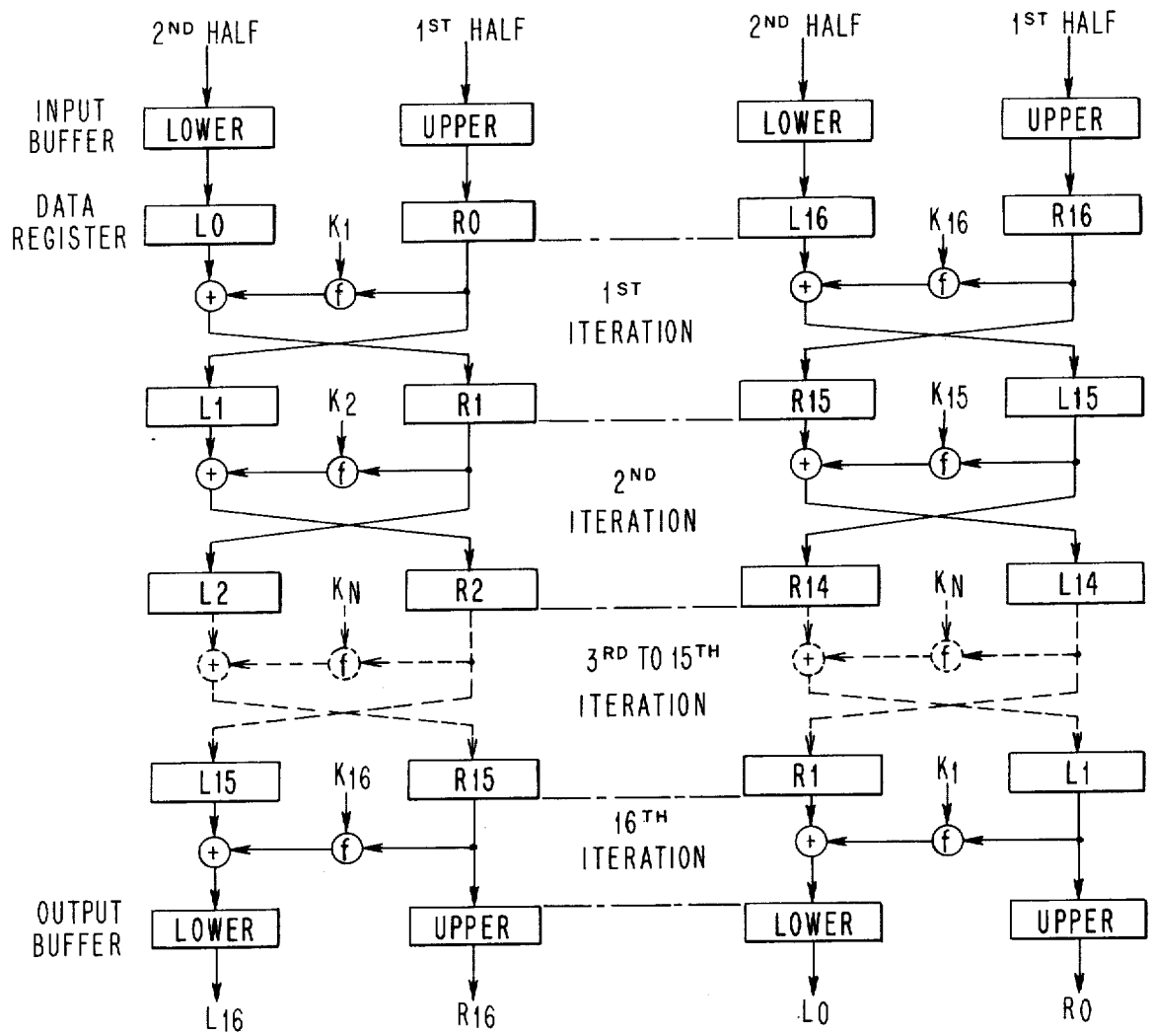
FIG. 8 is a block diagram of an enciphering and deciphering process using the cipher device of the present invention.

Referring now to FIGS. 3a through 3j, taken together, a detailed schematic diagram of the cipher device of the present invention is shown and a detailed description will follow taken in connection with the timing diagrams of FIGS. 7a and 7b.

Figure 4:
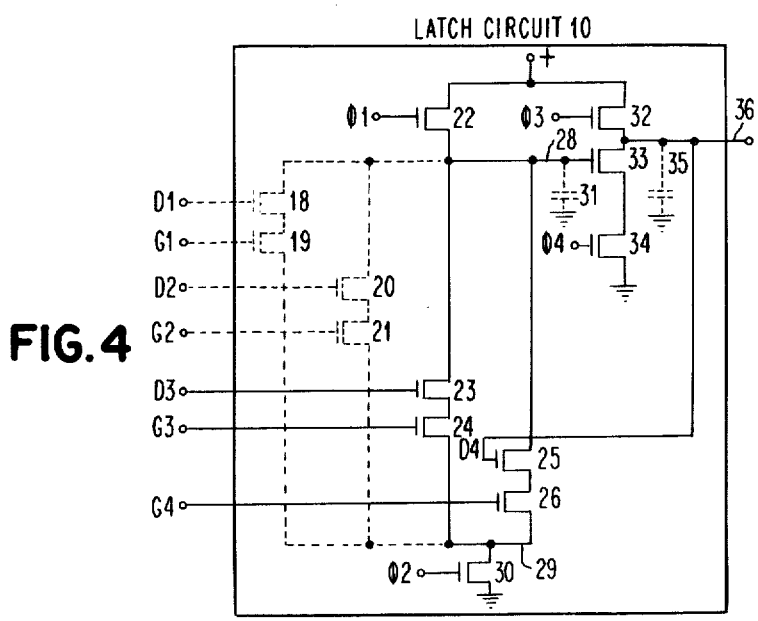
FIG. 4 illustrates the logic details of a latch circuit used in the present invention.

Before proceeding to a detailed description of the cipher device, refer to FIG. 4 which illustrates the logic detail of a latch circuit used throughout the present invention. The latch circuit 10 may be implemented with dynamic FET circuits operating with a 4 clock phase timing with each phase being 250 nanoseconds in duration giving a total of 1 microsecond for a complete clock cycle. The basic latch circuit consists of device 22 connected between a plus source and line 28 and having a gate electrode connected to receive a recurring clock signal 01; parallel pairs of serially connected devices 23 and 24 and 25 and 26, respectively, connected between lines 28 and 29 with each pair having gate electrodes connected to receive inputs D3 and G3 and inputs D4 and G4, respectively; a device 30 connected between line 29 and ground and having a gate electrode connected to receive a recurring clock signal 02; a group of three serially connected devices 32, 33 and 34 connected between the plus source and ground and each having a gate electrode respectively connected to a recurring clock signal 03, line 28 and a recurring clock signal 04 and the connection between devices 32 and 33 taken as the output line 26 of the latch circuit 10 and fed back as input D4 to the gate electrode of device 25. The stray and inter electrode capacitances within the circuit are lumped together and shown as dotted capacitors 31 and 35. Devices 23 and 24 and 25 and 26 effectively function as AND circuits, line 28 as a dot OR function and device 33 as an inverter.

Figure 5:
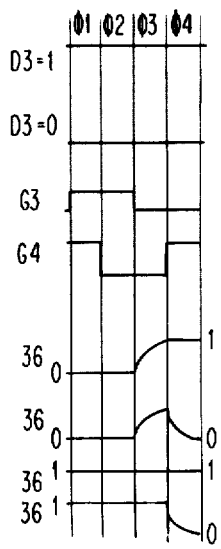
FIG. 5 comprises a series of timing diagrams explaining the operation of the latch circuit illustrated in FIG. 4.

In operation, and with reference to the timing diagrams of FIG. 5, assuming the latch circuit 10 is initially in a 0 state, then when the 01 clock signal is applied to render device 22 conductive, line 28 will be charged up to the plus source inasmuch as device 30 is nonconducting due to the absence of the 02 clock signal. When the 02 clock signal is next applied, the charge on line 28 will be maintained or discharged depending upon the signals being applied at inputs D3 and G3 or inputs D4 and G4. Since the latch circuit 10 is assumed to be in the 0 state, a lo level signal is applied at input D4 to maintain device 25 nonconducting and a lo level signal is applied to G4 to also maintain device 26 nonconducting and thereby block a discharge path through devices 25, 26 and 30. With respect to the discharge path including devices 23 and 24, if a 1 bit (hi level signal) is present at input D3 concurrently with a gate signal (hi level signal) at input G3, devices 23 and 24 conduct and provide a discharge path through device 30 thereby causing the signal on line 28 to discharge toward ground. On the other hand, if a 0-bit (lo level signal) is present at input D3 concurrently with a gate signal at input G3, then during 02 clock time device 23 will remain nonconducting to block the discharge path from line 28 through devices 24 and 30 and the hi level signal will be maintained on line 28.

When the 03 clock signal is next applied to the gate electrode of device 32, line 36 will be charged up to the plus source inasmuch as device 34 is maintained nonconducting due to the absence of a 04 clock signal. When the 04 clock signal is next applied to the gate electrode of device 34, the charge on line 36 will be maintained or discharged depending upon the level of the signal on line 28. If a lo level signal is present on line 28, representing an input of a data 1-bit, then during 04 clock time device 33 will remain nonconducting to block the discharge path from line 36 through device 34 and a hi level signal will be maintained on line 36 indicating the presence of a 1-bit. During 04 clock signal time valid data (1) is assured at the output of the latch circuit 10. Subsequent to setting the latch circuit 10 to the data 1-bit state, the positive signal at input D4 together with the positive signal applied to input G4 are effective to maintain a discharge path for line 28 so that a lo level signal will be maintained on line 28 irrespective of the signal levels at the inputs D3 and G3. This, in turn, maintains the device 33 non conducting to thereby block the discharge path through device 34 and maintain a hi level signal on line 36 so that circuit 10 will remain latched in the data 1 bit state until such time as a new data bit is to be entered whereupon gating pulses G3 and G4 and a data bit level D3 are applied as shown in FIG. 5. On the other hand, if a hi level signal is present on line 28, representing an input of a data 0 bit then during 04 clock time, device 33 will be conducting providing a discharge path through device 34 and a lo level signal will be maintained on line 36 indicating the presence of a 0 bit. In this case, during 04 clock signal time, as before, valid data (0) is assured at the output of the latch circuit 10. Subsequent to setting the latch circuit 10 to the data 0-bit state, the lo level signal at input D4 is effective to maintain the device 25 nonconducting thereby blocking the discharge path for line 28 and the lo level signal at input G3 is effective to maintain device 24 non conducting thereby blocking the other discharge path for line 28 so that a charge or hi level signal is maintained on line 28. This, in turn, maintains the device 33 conducting to thereby maintain the discharge path through device 34 and maintain a lo level signal on line 36 so that circuit 10 will remain latched in the data 0 bit state until such a time as a new data bit is to be entered whereupon gating pulses G3 and G4 and a data bit level D3 are applied as shown in FIG. 5. Thus, valid data is assured at the output of the latch circuit 10.

When the latch circuit 10 is the the 1 state, a clock cycle operation is initiated with a 01 clock signal applied to render device 22 conductive causing line 28 to be charged up to the plus source as before. When the 02 clock signal is next applied, the charge on line 28 will, as before, be maintained or discharged depending upon the signals being applied at inputs D3 and G3 or inputs D4 and G4. If a data 1-bit is applied at D3, a lo level signal is maintained on line 28 whereas if a data 0-bit is applied at D3 a hi level signal is maintained on line 28 as previously described. When the 03 clock signal is next applied to the gate electrode of device 32, line 36 will again be charged up to the plus source inasmuch as device 34 is maintained nonconducting due to the absence of a 04 clock signal. When the 04 clock signal is next applied to the gate electrode of device 34, the charge on line 36 will, as before, be maintained or discharged depending upon the level of the signal on line 28. If a lo level signal is present on line 28, representing an input data 1-bit then a hi level signal will be maintained on line 36 indicating the presence of a 1-bit whereas if a hi level signal is present on line 28, representing a input data 0-bit, then a lo level signal will be maintained on line 36 indicating the presence of a 0-bit, as previously described. The latch circuit 10 may be expanded to a 2-way input by the inclusion of devices 18 and 19 connected to inputs D1 and G1 or to a 3-way input by the inclusion of devices 20 and 21 connected to inputs D2 and G2. Throughout the embodiment of the present invention, which will now be described, 1-way, 2-way or 3-way input latch circuits will be utilized.

Figure 3A:
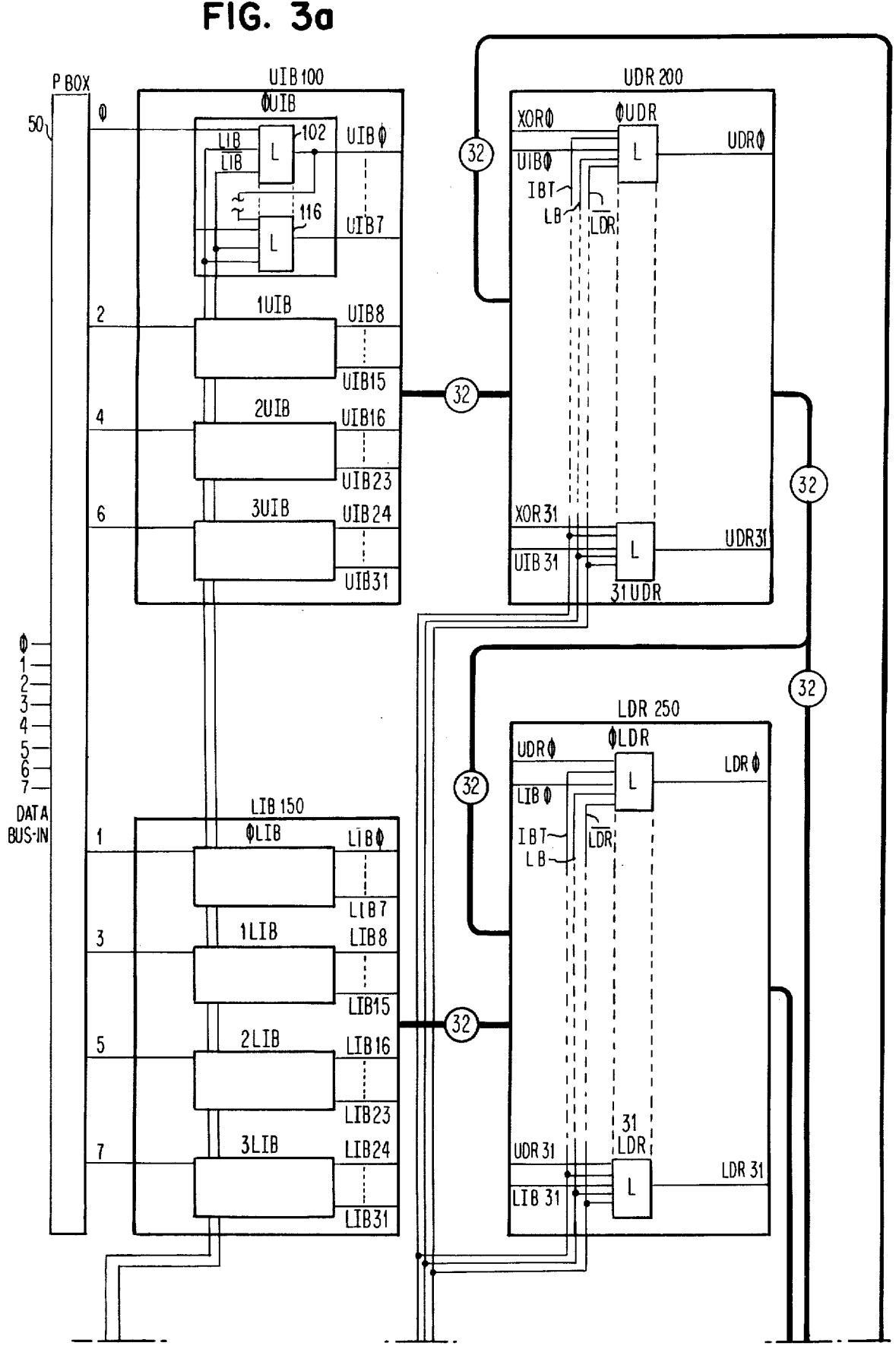

Referring now to FIG. 3a, a 64-bit message block of data consisting of 8 bytes is applied serially, a byte at a time, via the data bus-in to the P box 50. Each byte is subjected to an initial permutation by the P box 50 so that the byte of data is divided into two halves with the even data bits being applied to the UIB 100 and the odd data bits being applied to the LIB 150. The UIB 100 and LIB 150 each consist of four 8-stage shift registers 0UIB, 1UIB, 2UIB and 3UIB and 0LIB, 1LIB, 2LIB and 3LIB. The first and last stages of the first shift register 0UIB is shown in detail in FIG. 3a with the remaining shift registers being shown in block form inasmuch as they are identical in detail to that of the shift register 0UIB.

Referring to the timing diagram of FIG. 7a, during cycle 0, when a valid data byte is being applied to the UIB 100 and LIB 150, via the P box 50, signals are applied on the LIB (G3) and LIB (G4) lines causing the first 8-bit byte of data to be loaded into the latches of the first stage of each of the shift registers in UIB 100 and LIB 150. During cycles 1–7, the remaining 8-bit bytes of the message block are applied, a byte at a time, to the UIB 100 and LIB 150, each bit of the byte being applied to the first stage (D3) of each of the shift registers. Since the signals on the LIB and LIB lines are applied to each stage of the shift registers, then during each of the cycles 1–7 the data bits are shifted down by one position in each of the shift registers so that at the end of cycle 7 the UIB 100 and the LIB 150 are loaded with two halves of the applied message block of data. The UIB 100 and LIB 150 effectively perform a serial-to-parallel conversion so that the 8 bytes of the message block presently stored in the UIB 100 and the LIB 150 provide two 32-bit halves of the message block in parallel at the outputs of the UIB 100 and LIB 150.

Figure 3B:
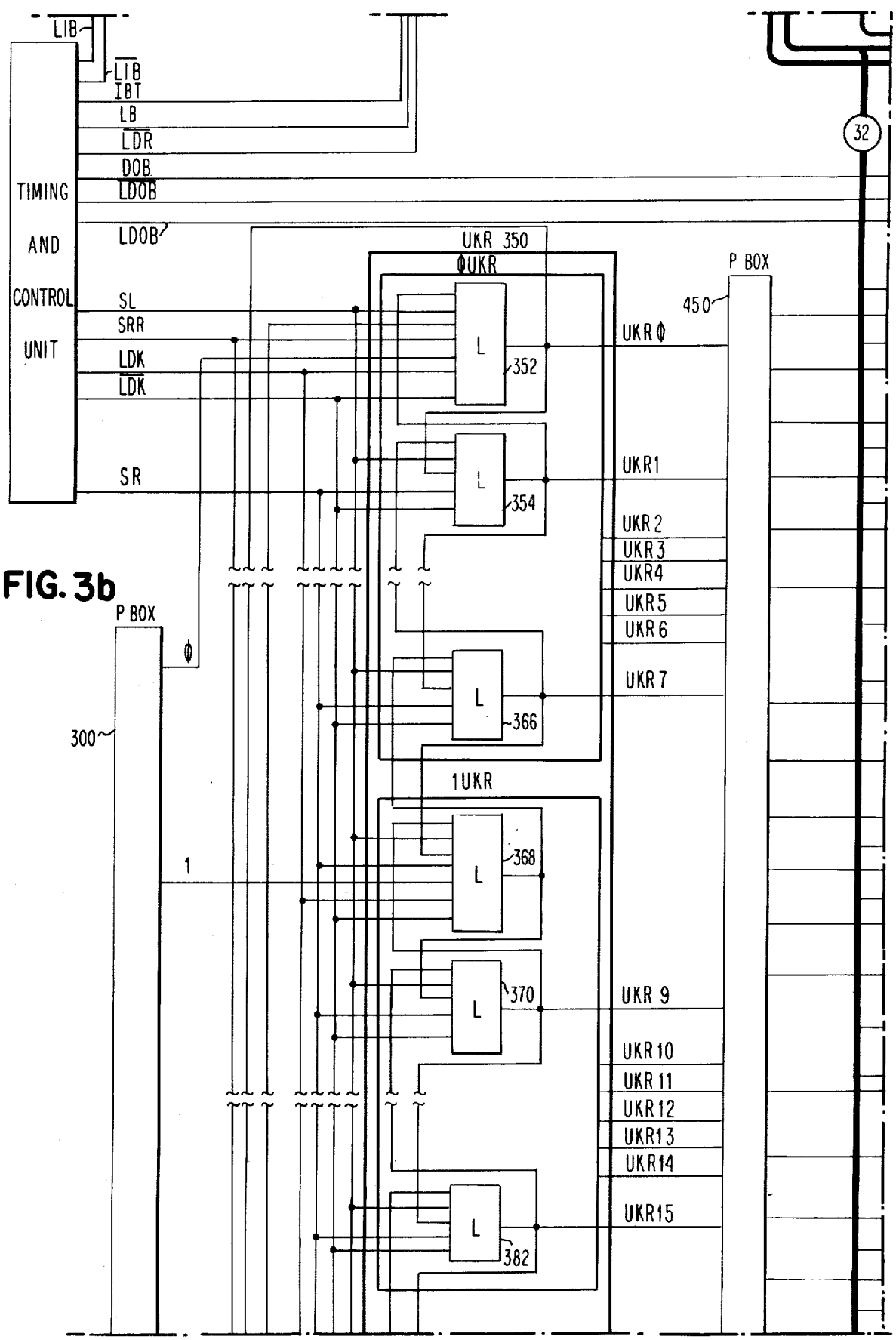
Figure 3C:
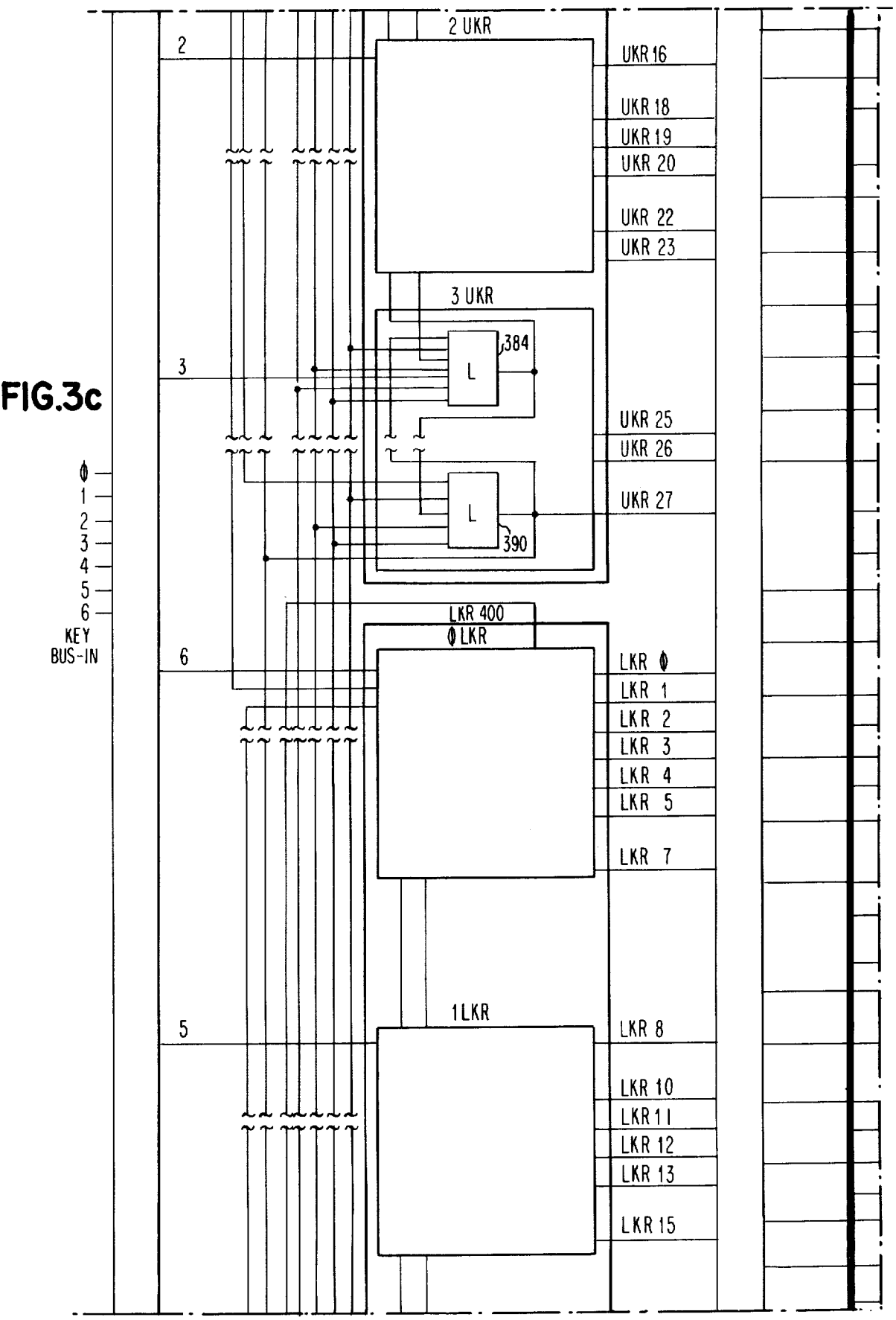

Referring now to FIGS. 3b, 3c and 3d, at the same time that the 64-bit message block is being received and buffered into the UIB 100 and the LIB 150, the cipher key is obtained from a 64-bit external register and applied serially, a 7-bit byte at a time, via the key bus-in to the P box 300. Each 7-bit byte is subject to an initial permutation by the P box 300 so that each byte is divided into two halves with the first 4 key bits being applied to the UKR 350 and the remaining 3 key bits being applied in a transposed manner to the LKR 400. UKR 350 and LKR 400 each consist of three 8-stage shift registers 0UKR, 1UKR, 2UKR and 0LKR, 1LKR, 2LKR, respectively, and one 4-stage shift register, 3UKR and 3LKR, respectively, with the output of the fourth stage of the shift register 3UKR being connected to the first stage of the shift register 3LKR. The 8-stage shift register 0UKR consists of one 3-way input latch 352 of the first stage and seven 2-way input latches, such as latches 354 and 366 of the second and last stages of the shift register 0UKR, shown in detail in FIG. 3b. The 8-stage shift register 1UKR also consists of one 3-way input latch 368 of the first stage and seven 2-way input latches, such as latches 370 and 382 of the second and last stages of the shift register 1UKR, shown in detail in FIG. 3b. The 8-stage shift register 2UKR is shown in block form in FIG. 3c inasmuch as it is identical in detail to that of shift register 1UKR. The 4-stage shift register 3UKR consists of one 3-way input latch 384 of the first stage and three 2-way input latches, such as latch 390 of the last stage of the shift register 3UKR, shown in detail in FIG. 3c. Similarly, the 8-stage shift registers 0LKR, 1LKR and 2LKR of the LKR 400 are shown in block form in FIGS. 3c and 3d inasmuch as they are identical in detail to that of the corresponding 8-stage shift registers 0UKR, 1UKR and 2UKR of the UKR 350. The 4-stage shift register 3LKR consists of one 3-way input latch 402 of the first stage, connected to the output of latch 390 of the last stage of shift register 3UKR, and three 2-way input latches, such as latch 408 of the last stage of the shift register 3LKR, shown in detail in FIG. 3d. Thus, for loading purposes, the combination of the UKR 350 and the LKR 500 may be considered as consisting of seven 8-stage shift registers for storing the key bits of the cipher key word.

Referring now to FIGS. 3b, 3c, and 3d and the timing diagram of FIG. 7a, during cycle 0, when a valid cipher key byte is applied to the UKR 350 and the LKR 400, via the P box 300, signals are applied on the LDK (G3) and LDK (G4) lines connected to the first stages of shift registers 0UKR, 1UKR, 2UKR, 3UKR, 0LKR, 1LKR and 2LKR causing the first 7-bit key byte to be loaded into the first stages of each of the seven shift registers in UKR 350 and LKR 400, as for example into input latches 352, 368, 384 and 402.

During cycle 1, the second of the eight 7-bit bytes of the cipher key is applied and loaded into the first stages of the seven shift registers in UKR 350 and LKR 400. At the same time, the previous contents of these stages, namely, the first of the eight 7-bit bytes, is shifted down one bit position by signals applied on the SR (G3) and LDK lines which are connected to the second stages of shift registers 0UKR, 1UKR, 2UKR, 3UKR, 0LKR, 1LKR and 2LKR. The resolving time within the latch of any stage being sufficient to allow the shift operation to occur before any change occurs at the output of the latch from the preceding stage.

During cycle 2, the third of the eight 7-bit bytes of the cipher key is applied and loaded into the first stages of the seven shift registers in UKR 350 and LKR 400. At the same time, the previous contents of the first and second stages, namely, the second and first of the eight 7-bit bytes, respectively, are shifted down 1 bit position by signals applied on the SR and $\overline{LDK}$ lines which are connected to the second and third stages of shift registers 0UKR, 1UKR, 2UKR, 3UKR, 0LKR, 1LKR and 2LKR.

During cycles 3 and 4, the fourth and fifth of the eight 7-bit bytes of the cipher key are applied and successively loaded into the first stages of the seven shift registers in UKR 350 and LKR 400 while the contents thereof are shifted successive 1 bit positions. However, it should be noted, referring to FIGS. 3c and 3d, that during cycle 4, the bit in the last stage of the 3UKR is shifted to the first stage of the shift register 3LKR. During cycles 5, 6 and 7, the remaining 7-bit bytes of the cipher key are applied, a 7-bit byte at a time, to the first stages of shift registers 0UKR, 1UKR, 2UKR, 3UKR, 0LKR, 1LKR and 2LKR of the UKR 350 and LKR 400. Since the signals on the LKR and $\overline{LKR}$ Lines are applied to the first stages of the shift registers and the signals on the SR and $\overline{LKR}$ lines are applied to the remaining stages of each of the shift registers, then during each of the cycles 5, 6 and 7, the cipher key bits are shifted down by one position so that at the end of cycle 7, UKR 350 and LKR 400 are loaded with two halves of the applied cipher key. In the laoding operation, the UKR 350 and LKR 400 effectively perform a serial-parallel conversion so that the eight 7-bit bytes of the cipher key, presently stored in UKR 350 and LKR 400, may be considered as two parallel 28-bit halves. The key bit mapping tables for loading UKR 350 and LKR 400 with the cipher key is as follows:

TABLE 1

CIPHER KEY MAP FOR UKR

| UKR Positions | Cipher Key Bits | | | | | | | |
|---|---|---|---|---|---|---|---|---|
| UKR 0 – UKR 7 | 56 | 48 | 40 | 32 | 24 | 16 | 8 | 0 |
| UKR 8 – UKR 15 | 57 | 49 | 41 | 33 | 25 | 17 | 9 | 1 |
| UKR 16 – UKR 23 | 58 | 50 | 42 | 34 | 26 | 18 | 10 | 2 |
| UKR 24 – UKR 27 | 59 | 51 | 43 | 35 | | | | |

TABLE 2

CIPHER KEY MAP FOR LKR

| LKR Positions | Cipher Key Bits | | | | | | | |
|---|---|---|---|---|---|---|---|---|
| LKR 0 – LKR 7 | 62 | 54 | 46 | 38 | 30 | 22 | 14 | 6 |
| LKR 8 – LKR 15 | 61 | 53 | 45 | 37 | 29 | 21 | 13 | 5 |
| LKR 16 – LKR 23 | 60 | 52 | 44 | 36 | 28 | 20 | 12 | 4 |
| LKR 24 – LKR 27 | 27 | 19 | 11 | 3 | | | | |

Referring now to FIG. 3a and the timing diagram of FIG. 7a, UDR 200 and LDR 250 each consist of 32 stages comprising latches 0UDR and 31UDR and 0LDR to 31LDR, respectively. During cycle 8, signals are applied to the IBT and $\overline{LDR}$ line to cause a parallel transfer of the 32 data bits in the UIB 100 and the 32 data bits in the LIB 150 to the UDR 200 and the LDR 250, respectively. Thus, the 64 bits of the message block are distributed in UDR 200 and LDR 250 as follows:

TABLE 3

DATA MAP FOR UDR

| UDR Positions | Data Bits | | | | | | | |
|---|---|---|---|---|---|---|---|---|
| UDR 0 – UDR 7 | 56 | 48 | 40 | 32 | 24 | 16 | 8 | 0 |
| UDR 8 – UDR 15 | 58 | 50 | 42 | 34 | 26 | 18 | 10 | 2 |
| UDR 16 – UDR 23 | 60 | 52 | 44 | 36 | 28 | 20 | 12 | 4 |
| UDR 24 – UDR 31 | 62 | 54 | 46 | 38 | 30 | 22 | 14 | 6 |

TABLE 4

DATA MAP FOR LDR

| LDR Positions | Data Bits | | | | | | | |
|---|---|---|---|---|---|---|---|---|
| LDR 0 – LDR 7 | 57 | 49 | 41 | 33 | 25 | 17 | 9 | 1 |
| LDR 8 – LDR 15 | 59 | 51 | 43 | 35 | 27 | 19 | 11 | 3 |
| LDR 16 – LDR 23 | 61 | 53 | 45 | 37 | 29 | 21 | 13 | 5 |
| LDR 24 – LDR 31 | 63 | 55 | 47 | 39 | 31 | 23 | 15 | 7 |

Referring now to FIGS. 3b, 3c and 3d and the timing diagram of FIG. 7a, it should be noted that no further signals are produced on LDK line. Accordingly, the connection from the last latch 390 of the shift register 3UKR to the first latch 402 of the shift register 3LKR is no longer used to transfer any bits due to the absence of any further signals applied to the LDK line. Additionally, the output of the last latch 390 in the shift register 3UKR and the output of the last latch 408 in the shift register 3LKR are connected back to the first latch 352, of the shift register 0LKR, respectively. Therefore, UKR 350 and LKR 400 may be considered as two independent 28-bit shift registers. Prior to the enciphering process, the cipher key bits presently stored in UKR 350 and LKR 400 are preshifted up 1 bit position with the bit stored in the first latch 352 of UKR 350 being shifted around to the last latch 390 of UKR 350 and the bit in the first stage of the LKR 400 being shifted around to the last latch 408 of the LKR 400. This is accomplished, in cycle 8, by signals being applied to the SL and $\overline{LDK}$ lines which are connected to every stage of the UKR 350 and LKR 400. The output of every latch is connected to the preceding latch and in combination with the signals on the SL and $\overline{LDK}$ lines is effective to transfer the bit from one latch to the preceding latch. For example, the output UKR1 from the latch 354 is connected to one input of the latch 352 which is combination with the signals on the SL and $\overline{LDK}$ lines is effective to shift the bit content of latch 354 to latch 352. Similarly, the output UKR0 from the latch 352 is connected to one input of the latch 390 which, in combination with the signals on the SL and $\overline{LDK}$ lines is effective to shift the bit content of the latch 352 to the latch 390. This preshift of the cipher key bits by one bit position before the beginning of the enciphering process assures proper alignment of the key bits in the first iteration of the enciphering process. In the ensuing enciphering process, UKR 350 and LKR 400 are shifted up by one or two bit positions during each iteration of the enciphering process except the first to provide 27 additional shifts of the cipher key bits in UKR 350 and LKR 400. Since UKR 350 and LKR 400 are 28-bit shift registers, the 28 shifts of the cipher key bits in UKR 350 and LKR 400, consisting of the one preshift and the 27 shifts during the enciphering process, assures proper alignment of the cipher key bits during the iteration operations as well as the beginning of the enciphering operation. The predetermined shift schedule for the cipher key is shown in the following Table 5:

TABLE 5

| ITERATION NO. | CIPHER KEY SHIFT SCHEDULE ENCIPHER (SHIFT UP) | DECIPHER (SHIFT DOWN) |
|---|---|---|
| | (Preshift) 1 | |
| 1 | | |
| 2 | 1 | 1 |
| 3 | 2 | 2 |
| 4 | 2 | 2 |
| 5 | 2 | 2 |
| 6 | 2 | 2 |
| 7 | 2 | 2 |
| 8 | 2 | 2 |
| 9 | 1 | 1 |
| 10 | 2 | 2 |
| 11 | 2 | 2 |
| 12 | 2 | 2 |
| 13 | 2 | 2 |
| 14 | 2 | 2 |
| 15 | 2 | 2 |
| 16 | 1 | 1 |
| | (Postshift) | 1 |

A one in the shift schedule of Table 5 indicates a one bit position shift in the UKR 350 and LKR 400 while a two in the table indicates a two-bit position shift of the UKR 350 and LKR 400.

ENCIPHERING PROCESS

An enciphering process using a cipher device of the present invention consists of a series of 16 iteration operations to encipher a message block of data bits.

Referring now to FIGS. 3b to 3d and the timing diagram of FIG. 7a, a preshift of the cipher key bits in UKR 350 and LKR 400 is performed during cycle 8 before the enciphering process is carried out. Thus, first signals on SL and $\overline{\text{LDR}}$ lines applied to all stages of UKR 350 and LKR 400 causes a 1 bit position shift up of the cipher key in accordance with the cipher key shift schedule. This provides a valid first set of cipher key bits at the end of cycle 8 for the first iteration operation of the enciphering process. The first iteration operation of the enciphering process is carried out during cycle 9 and cycle 10 and is initiated by linearly transforming 24 of the 28 preshifted cipher key bits in UKR 350 and 24 of the 28 preshifted cipher key bits in LKR 400 in P box 450. The box 450 provides an arbitrary but fixed permutation of the 48 bits from the UKR 350 and LKR 400 according to the following cipher key bit mapping Tables 6 and 7:

TABLE 6

| UKR CIPHER KEY BIT PERMUTATION MAP | |
|---|---|
| UKR BIT NO. | PERMUTED UKR BIT NO. |
| UKR 0 | UKR 13 |
| UKR 1 | UKR 16 |
| UKR 2 | UKR 10 |
| UKR 3 | UKR 23 |
| UKR 4 | UKR 0 |
| UKR 5 | UKR 4 |
| UKR 6 | UKR 2 |
| UKR 7 | UKR 27 |
| UKR 9 | UKR 14 |
| UKR 10 | UKR 5 |
| UKR 11 | UKR 20 |
| UKR 12 | UKR 9 |
| UKR 13 | UKR 22 |
| UKR 14 | UKR 18 |
| UKR 15 | UKR 11 |
| UKR 16 | UKR 3 |
| UKR 18 | UKR 25 |
| UKR 19 | UKR 7 |
| UKR 20 | UKR 15 |
| UKR 22 | UKR 6 |
| UKR 23 | UKR 26 |
| UKR 25 | UKR 19 |
| UKR 26 | UKR 12 |

TABLE 6-continued

| UKR CIPHER KEY BIT PERMUTATION MAP | |
|---|---|
| UKR BIT NO. | PERMUTED UKR BIT NO. |
| UKR 27 | UKR 1 |

TABLE 7

| LKR CIPHER KEY BIT PERMUTATION MAP | |
|---|---|
| LKR BIT NO. | PERMUTED LKR BIT NO. |
| LKR 0 | LKR 12 |
| LKR 1 | LKR 23 |
| LKR 2 | LKR 2 |
| LKR 3 | LKR 8 |
| LKR 4 | LKR 18 |
| LKR 5 | LKR 26 |
| LKR 7 | LKR 1 |
| LKR 8 | LKR 11 |
| LKR 10 | LKR 22 |
| LKR 11 | LKR 16 |
| LKR 12 | LKR 4 |
| LKR 13 | LKR 19 |
| LKR 15 | LKR 15 |
| LKR 16 | LKR 20 |
| LKR 17 | LKR 10 |
| LKR 18 | LKR 27 |
| LKR 19 | LKR 5 |
| LKR 20 | LKR 24 |
| LKR 21 | LKR 17 |
| LKR 22 | LKR 13 |
| LKR 23 | LKR 21 |
| LKR 24 | LKR 7 |
| LKR 26 | LKR 0 |
| LKR 27 | LKR 3 |

Figure 3E:
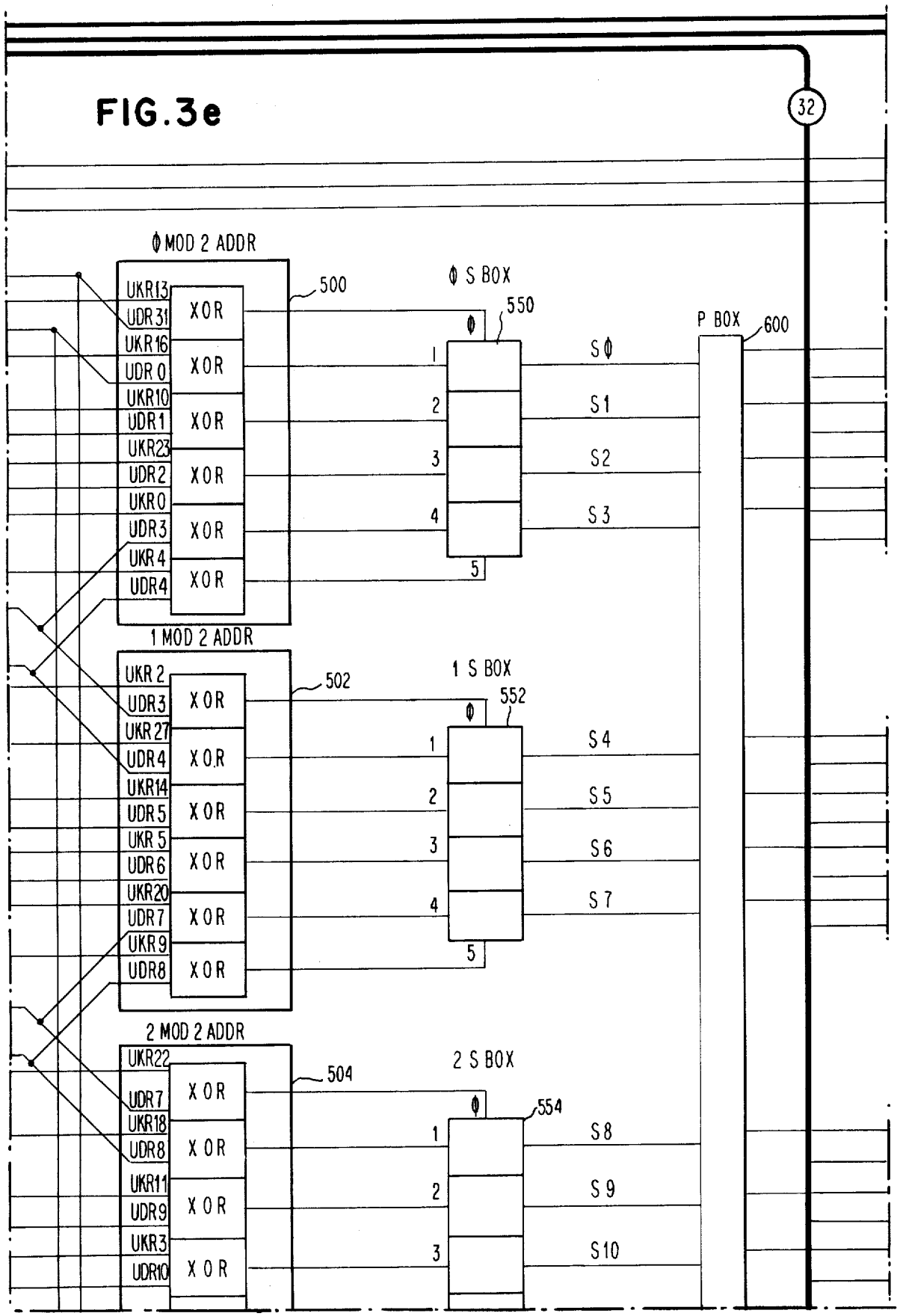
Figure 3G:
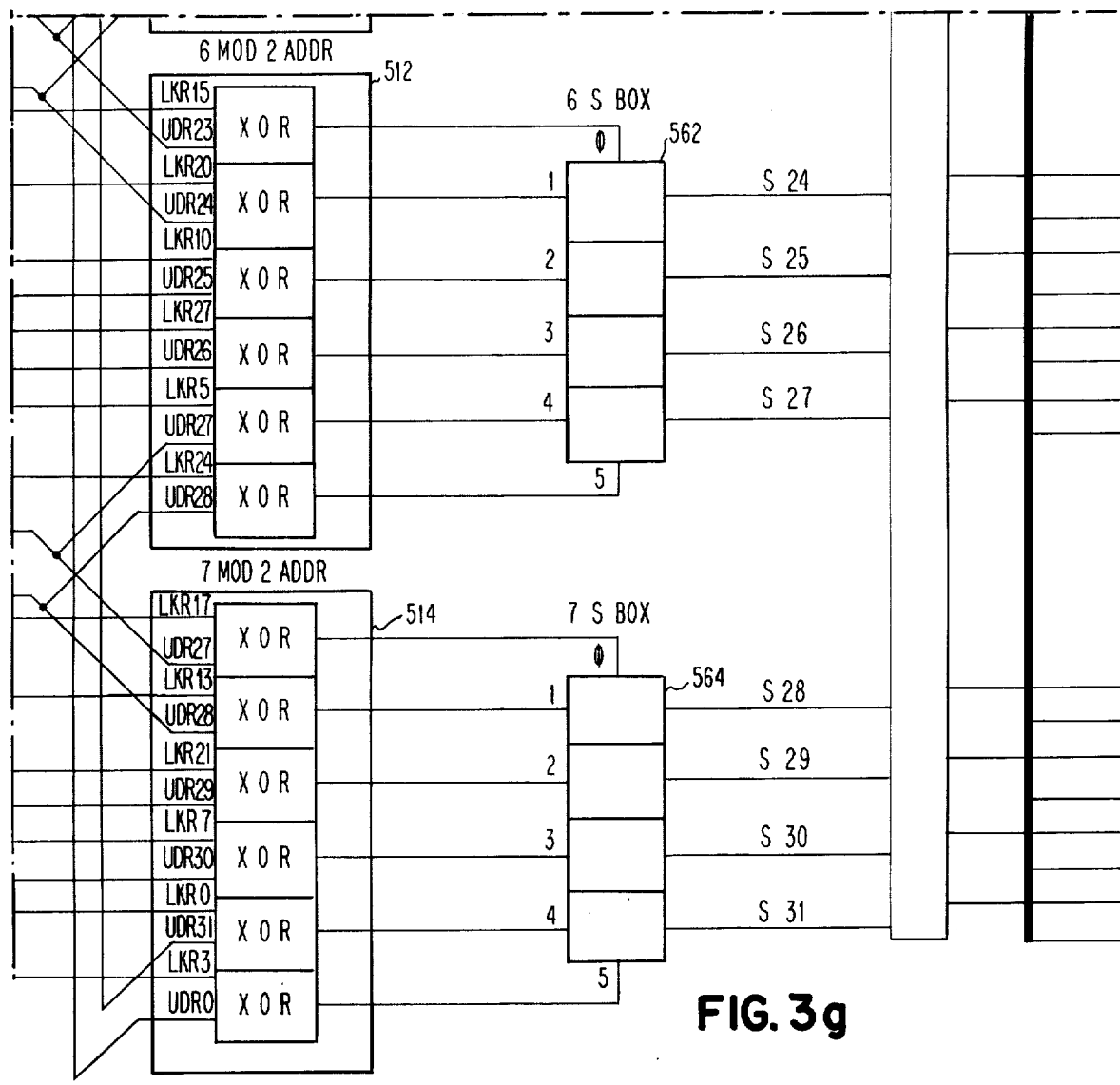

The 48 permuted cipher key bits considered as eight 6-bit segments are applied as one input of the eight modulo-2 adders 500, 502, 504, 506, 508, 510, 512 and 514, each of which consists of six exclusive OR's. At the same time, the first half of the message block contained in UDR 200, consisting of 32 data bits considered as eight 4-bit data segments, is expanded into 48 data bits consisting of eight 6-bit data segments and applied as the other input of the eight modulo-2 adders 500 to 514. The expansion is accomplished by duplicating the end bits of each of the eight 4-bit data segments as shown in FIGS. 3e, 3f and 3g. The eight modulo-2 adders 500 to 514 effectively combine the expanded 48 data bits in parallel with the permuted 48 cipher key bits producing eight 6-bit segments forming the actual arguments for eight nonaffine substitution function boxes 550 to 564 as set forth in the following Tables 8 and 9:

TABLE 8

| S BOX MAPPING SCHEDULE A | | | |
|---|---|---|---|
| PERMUTED UKR BIT NO. | UDR BIT NO. | S BOX BIT NO. | S BOX NO. |
| UKR 13 | ⊕ UDR 31 | 0 | 0 |
| UKR 16 | ⊕ UDR 0 | 1 | 0 |
| UKR 10 | ⊕ UDR 1 | 2 | 0 |
| UKR 23 | ⊕ UDR 2 | 3 | 0 |
| UKR 0 | ⊕ UDR 3 | 4 | 0 |
| UKR 4 | ⊕ UDR 4 | 5 | 0 |
| UKR 2 | ⊕ UDR 3 | 0 | 1 |
| UKR 27 | ⊕ UDR 4 | 1 | 1 |
| UKR 14 | ⊕ UDR 5 | 2 | 1 |
| UKR 5 | ⊕ UDR 6 | 3 | 1 |
| UKR 20 | ⊕ UDR 7 | 4 | 1 |
| UKR 9 | ⊕ UDR 8 | 5 | 1 |
| UKR 22 | ⊕ UDR 7 | 0 | 2 |
| UKR 18 | ⊕ UDR 8 | 1 | 2 |
| UKR 11 | ⊕ UDR 9 | 2 | 2 |
| UKR 3 | ⊕ UDR 10 | 3 | 2 |
| UKR 25 | ⊕ UDR 11 | 4 | 2 |
| UKR 7 | ⊕ UDR 12 | 5 | 2 |
| UKR 15 | ⊕ UDR 11 | 0 | 3 |
| UKR 6 | ⊕ UDR 12 | 1 | 3 |
| UKR 26 | ⊕ UDR 13 | 2 | 3 |
| UKR 19 | ⊕ UDR 14 | 3 | 3 |
| UKR 12 | ⊕ UDR 15 | 4 | 3 |
| UKR 1 | ⊕ UDR 16 | 5 | 3 |

TABLE 9

| S BOX MAPPING SCHEDULE B | | | |
|---|---|---|---|
| PERMUTED LKR BIT NO. | UDR BIT NO. | S BOX BIT NO. | S BOX NO. |
| LKR 12 | ⊕ UDR 15 | 0 | 4 |
| LKR 23 | ⊕ UDR 16 | 1 | 4 |
| LKR 2 | ⊕ UDR 17 | 2 | 4 |
| LKR 8 | ⊕ UDR 18 | 3 | 4 |
| LKR 18 | ⊕ UDR 19 | 4 | 4 |
| LKR 26 | ⊕ UDR 20 | 5 | 4 |
| LKR 1 | ⊕ UDR 19 | 0 | 5 |
| LKR 11 | ⊕ UDR 20 | 1 | 5 |
| LKR 22 | ⊕ UDR 21 | 2 | 5 |
| LKR 16 | ⊕ UDR 22 | 3 | 5 |
| LKR 4 | ⊕ UDR 23 | 4 | 5 |
| LKR 19 | ⊕ UDR 24 | 5 | 5 |
| LKR 15 | ⊕ UDR 23 | 0 | 6 |
| LKR 20 | ⊕ UDR 24 | 1 | 6 |
| LKR 10 | ⊕ UDR 25 | 2 | 6 |
| LKR 27 | ⊕ UDR 26 | 3 | 6 |
| LKR 5 | ⊕ UDR 27 | 4 | 6 |
| LKR 24 | ⊕ UDR 28 | 5 | 6 |
| LKR 17 | ⊕ UDR 27 | 0 | 7 |
| LKR 13 | ⊕ UDR 28 | 1 | 7 |
| LKR 21 | ⊕ UDR 29 | 2 | 7 |
| LKR 7 | ⊕ UDR 30 | 3 | 7 |
| LKR 0 | ⊕ UDR 31 | 4 | 7 |
| LKR 3 | ⊕ UDR 0 | 5 | 7 |

Figure 6:
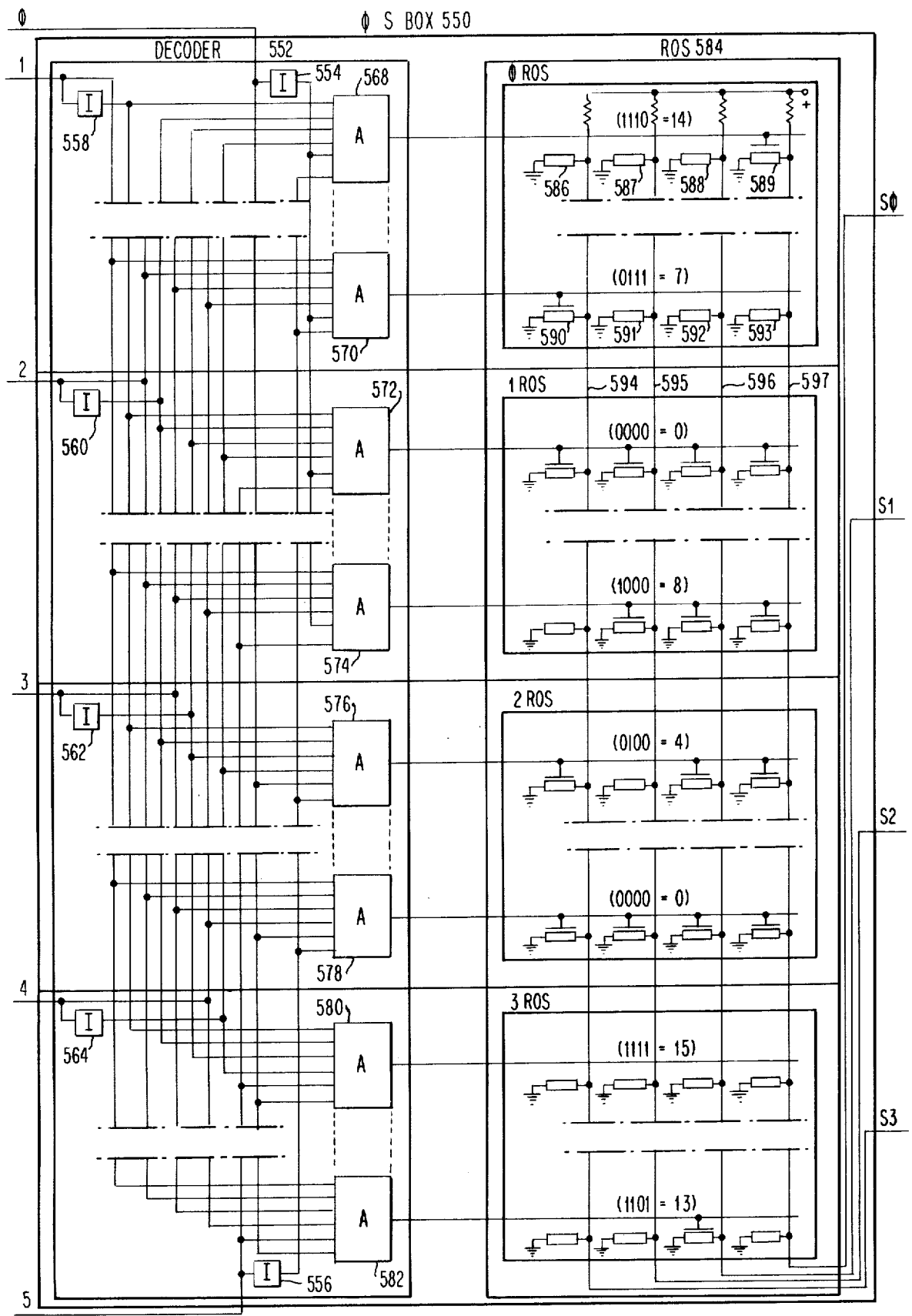
FIG. 6 illustrates the details of a substitution box used in the present invention.

Referring now to FIG. 6, representative 0 S-Box 550 is shown consisting of decoder 552 and read only storage (ROS) 584. A 6-bit segment from the 0 modulo-2 adder 500 is applied as the input to the 0 S-box 550. Signals representing the end bits of the applied 6-bit segment, resulting from the modulo-2 addition of duplicated data bit UDR 31 and the permuted cipher key bit UKR 13 and the modulo-2 addition of the duplicated data bit UDR 4 and the permuted cipher key bit UKR 4 are applied to inverters 554 and 556 to thereby provide true and complement signals representing the end bits of the applied 6-bit segment. When the result of the end bit modulo-2 addition is 00, one of four groups of 16 AND circuits are selected, namely AND circuits 568 to 570. Likewise, when the result of the end bit modulo-2 addition is 01, the second of the four groups of 16 AND circuits are selected, namely, AND circuits 572 to 574. Similarly, when the result of the end bit modulo-2 addition is 10, the third of four groups of 16 AND circuits are selected, namely, AND circuits 576 and 578. Lastly, when the result of the end bit modulo-2 addition is 11, the fourth of the four groups of 16 AND circuits are selected, namely, AND circuits 580 to 582. Signals representing the inner four bits of the applied 6-bit segment are applied to inverters 558, 560, 562 and 564 to thereby provide true and complement signals representing the inner 4 bits of the applied 6-bit segment. The inner 4 bits of the 6-bit segment are decoded by one of the 16 AND circuits of the selected group to apply a driving signal to an address line of the ROS 584. ROS 584 essentially consists of four function tables, 0ROS, 1ROS, 2ROS, and 3ROS, each containing 16 entries and each entry consisting of 4 bits in the form of four FET devices such as devices 586, 587, 588 and 589, or devices 590, 591, 592 and 593. The devices, when selected, produce a unique 4-bit segment on the output lines 594, 595, 596 and 597 of ROS 584 which are applied to the four output lines S0, S1, S2 and S3 of the S-Box 550. While the arrangement of the other seven of the eight S-Boxes are similar to that of 0 S-Box 550, the function tables in each of the other S-Boxes are different from each other, thereby providing eight different transformation functions. The outputs of the function tables of the eight S-Boxes are shown in the following Tables 10, 11, 12 and 13 of S-Box functions where each output number represents a 4-bit (Hexadecimal) binary pattern, i.e., 14 = 1 1 1 0:

TABLE 10

| | S-BOX FUNCTION TABLE A | | | | | | | |
|---|---|---|---|---|---|---|---|---|
| | 0 S-BOX | | | | 1 S-BOX | | | |
| | S BOX END BITS | | | | S BOX END BITS | | | |
| S BOX INNER BITS | 00 (0) | 01 (1) | 10 (2) | 11 (3) | 00 (0) | 01 (1) | 10 (2) | 11 (3) |
| 0000 (0) | 14 | 0 | 4 | 15 | 15 | 3 | 0 | 13 |
| 0001 (1) | 4 | 15 | 1 | 12 | 1 | 13 | 14 | 8 |
| 0010 (2) | 13 | 7 | 14 | 8 | 8 | 4 | 7 | 10 |
| 0011 (3) | 1 | 4 | 8 | 2 | 14 | 7 | 11 | 1 |
| 0100 (4) | 2 | 14 | 13 | 4 | 6 | 15 | 10 | 3 |
| 0101 (5) | 15 | 2 | 6 | 9 | 11 | 2 | 4 | 15 |
| 0110 (6) | 11 | 13 | 2 | 1 | 3 | 8 | 13 | 4 |
| 0111 (7) | 8 | 1 | 11 | 7 | 4 | 14 | 1 | 2 |
| 1000 (8) | 3 | 10 | 15 | 5 | 9 | 12 | 5 | 11 |
| 1001 (9) | 10 | 6 | 12 | 11 | 7 | 0 | 8 | 6 |
| 1010 (10) | 6 | 12 | 9 | 3 | 2 | 1 | 12 | 7 |
| 1011 (11) | 12 | 11 | 7 | 14 | 13 | 10 | 6 | 12 |
| 1100 (12) | 5 | 9 | 3 | 10 | 12 | 6 | 9 | 0 |
| 1101 (13) | 9 | 5 | 10 | 0 | 0 | 9 | 3 | 5 |
| 1110 (14) | 0 | 3 | 5 | 6 | 5 | 11 | 2 | 14 |
| 1111 (15) | 7 | 8 | 0 | 13 | 10 | 5 | 15 | 9 |

TABLE 11

| | S-BOX FUNCTION TABLE B | | | | | | | |
|---|---|---|---|---|---|---|---|---|
| | 2 S-BOX | | | | 3 S-BOX | | | |
| | S BOX END BITS | | | | S BOX END BITS | | | |
| S BOX INNER BITS | 00 (0) | 01 (1) | 10 (2) | 11 (3) | 00 (0) | 01 (1) | 10 (2) | 11 (3) |
| 0000 (0) | 10 | 13 | 13 | 1 | 7 | 13 | 10 | 3 |
| 0001 (1) | 0 | 7 | 6 | 10 | 13 | 8 | 6 | 15 |
| 0010 (2) | 9 | 0 | 4 | 13 | 14 | 11 | 9 | 0 |
| 0011 (3) | 14 | 9 | 9 | 0 | 3 | 5 | 0 | 6 |
| 0100 (4) | 6 | 3 | 8 | 6 | 0 | 6 | 12 | 10 |
| 0101 (5) | 3 | 4 | 15 | 9 | 6 | 15 | 11 | 1 |
| 0110 (6) | 15 | 6 | 3 | 8 | 9 | 0 | 7 | 13 |
| 0111 (7) | 5 | 10 | 0 | 7 | 10 | 3 | 13 | 8 |
| 1000 (8) | 1 | 2 | 11 | 4 | 1 | 4 | 15 | 9 |
| 1001 (9) | 13 | 8 | 1 | 15 | 2 | 7 | 1 | 4 |
| 1010 (10) | 12 | 5 | 2 | 14 | 8 | 2 | 3 | 5 |
| 1011 (11) | 7 | 14 | 12 | 3 | 5 | 12 | 14 | 11 |
| 1100 (12) | 11 | 12 | 5 | 11 | 11 | 1 | 5 | 12 |
| 1101 (13) | 4 | 11 | 10 | 5 | 12 | 10 | 2 | 7 |
| 1110 (14) | 2 | 15 | 14 | 2 | 4 | 14 | 8 | 2 |
| 1111 (15) | 8 | 1 | 7 | 12 | 15 | 9 | 4 | 14 |

TABLE 12

S-BOX FUNCTION TABLE C

| S BOX INNER BITS | 4 S-BOX S BOX END BITS | | | | 5 S-BOX S BOX END BITS | | | |
|---|---|---|---|---|---|---|---|---|
| | 00 (0) | 01 (1) | 10 (2) | 11 (3) | 00 (0) | 01 (1) | 10 (2) | 11 (3) |
| 0000 (0) | 2 | 14 | 4 | 11 | 12 | 10 | 9 | 4 |
| 0001 (1) | 12 | 11 | 2 | 8 | 1 | 15 | 14 | 3 |
| 0010 (2) | 4 | 2 | 1 | 12 | 10 | 4 | 15 | 2 |
| 0011 (3) | 1 | 12 | 11 | 7 | 15 | 2 | 5 | 12 |
| 0100 (4) | 7 | 4 | 10 | 1 | 9 | 7 | 2 | 9 |
| 0101 (5) | 10 | 7 | 13 | 14 | 2 | 12 | 8 | 5 |
| 0110 (6) | 11 | 13 | 7 | 2 | 6 | 9 | 12 | 15 |
| 0111 (7) | 6 | 1 | 8 | 13 | 8 | 5 | 3 | 10 |
| 1000 (8) | 8 | 5 | 15 | 6 | 0 | 6 | 7 | 11 |
| 1001 (9) | 5 | 0 | 9 | 15 | 13 | 1 | 0 | 14 |
| 1010 (10) | 3 | 15 | 12 | 0 | 3 | 13 | 4 | 1 |
| 1011 (11) | 15 | 10 | 5 | 9 | 4 | 14 | 10 | 7 |
| 1100 (12) | 13 | 3 | 6 | 10 | 14 | 0 | 1 | 6 |
| 1101 (13) | 0 | 9 | 3 | 4 | 7 | 11 | 13 | 0 |
| 1110 (14) | 14 | 8 | 0 | 5 | 5 | 3 | 11 | 8 |
| 1111 (15) | 9 | 6 | 14 | 3 | 11 | 8 | 6 | 13 |

TABLE 13

S-BOX FUNCTION TABLE D

| S BOX INNER BITS | 6 S-BOX S BOX END BITS | | | | 7 S-BOX S BOX END BITS | | | |
|---|---|---|---|---|---|---|---|---|
| | 00 (0) | 01 (1) | 10 (2) | 11 (3) | 00 (0) | 01 (1) | 10 (2) | 11 (3) |
| 0000 (0) | 4 | 13 | 1 | 6 | 13 | 1 | 7 | 2 |
| 0001 (1) | 11 | 0 | 4 | 11 | 2 | 15 | 11 | 1 |
| 0010 (2) | 2 | 11 | 11 | 13 | 8 | 13 | 4 | 14 |
| 0011 (3) | 14 | 7 | 13 | 8 | 4 | 8 | 1 | 7 |
| 0100 (4) | 15 | 4 | 12 | 1 | 6 | 10 | 9 | 4 |
| 0101 (5) | 0 | 9 | 3 | 4 | 15 | 3 | 12 | 10 |
| 0110 (6) | 8 | 1 | 7 | 10 | 11 | 7 | 14 | 8 |
| 0111 (7) | 13 | 10 | 14 | 7 | 1 | 4 | 2 | 13 |
| 1000 (8) | 3 | 14 | 10 | 9 | 10 | 12 | 0 | 15 |
| 1001 (9) | 12 | 3 | 15 | 5 | 9 | 5 | 6 | 12 |
| 1010 (10) | 9 | 5 | 6 | 0 | 3 | 6 | 10 | 9 |
| 1011 (11) | 7 | 12 | 8 | 15 | 14 | 11 | 13 | 0 |
| 1100 (12) | 5 | 2 | 0 | 14 | 5 | 0 | 15 | 3 |
| 1101 (13) | 10 | 15 | 5 | 2 | 0 | 14 | 3 | 5 |
| 1110 (14) | 6 | 8 | 9 | 3 | 12 | 9 | 5 | 6 |
| 1111 (15) | 1 | 6 | 2 | 12 | 7 | 2 | 8 | 11 |

Referring now to FIGS. 3e, 3f and 3g, the eight S-boxes 550 to 564 produce eight 4-bit segments defining a substitution set of 32 bits which are linearly transformed by an arbitrary but fixed permutation in P box 600. The combined nonlinear transformation performed by the S-Boxes 550 to 564 and the linear transformation performed by the P Box 600 results in a product block cipher of the first half of the message block. The linear permutation of the S-Box outputs is shown in the following Table 14:

TABLE 14

S-BOX OUTPUT PERMUTATION MAP

| S BOX BIT NO. | PERMUTED S BOX BIT NO. |
|---|---|
| S0 | S8 |
| S1 | S16 |
| S2 | S22 |
| S3 | S30 |
| S4 | S12 |
| S5 | S27 |
| S6 | S1 |
| S7 | S17 |
| S8 | S23 |
| S9 | S15 |
| S10 | S29 |
| S11 | S5 |
| S12 | S25 |
| S13 | S19 |
| S14 | S9 |
| S15 | S0 |
| S16 | S7 |
| S17 | S13 |
| S18 | S24 |
| S19 | S2 |
| S20 | S3 |

TABLE 14-continued

S-BOX OUTPUT PERMUTATION MAP

| S BOX BIT NO. | PERMUTED S BOX BIT NO. |
|---|---|
| S21 | S28 |
| S22 | S10 |
| S23 | S18 |
| S24 | S31 |
| S25 | S11 |
| S26 | S21 |
| S27 | S6 |
| S28 | S4 |
| S29 | S26 |
| S30 | S14 |
| S31 | S20 |

Figure 3H:
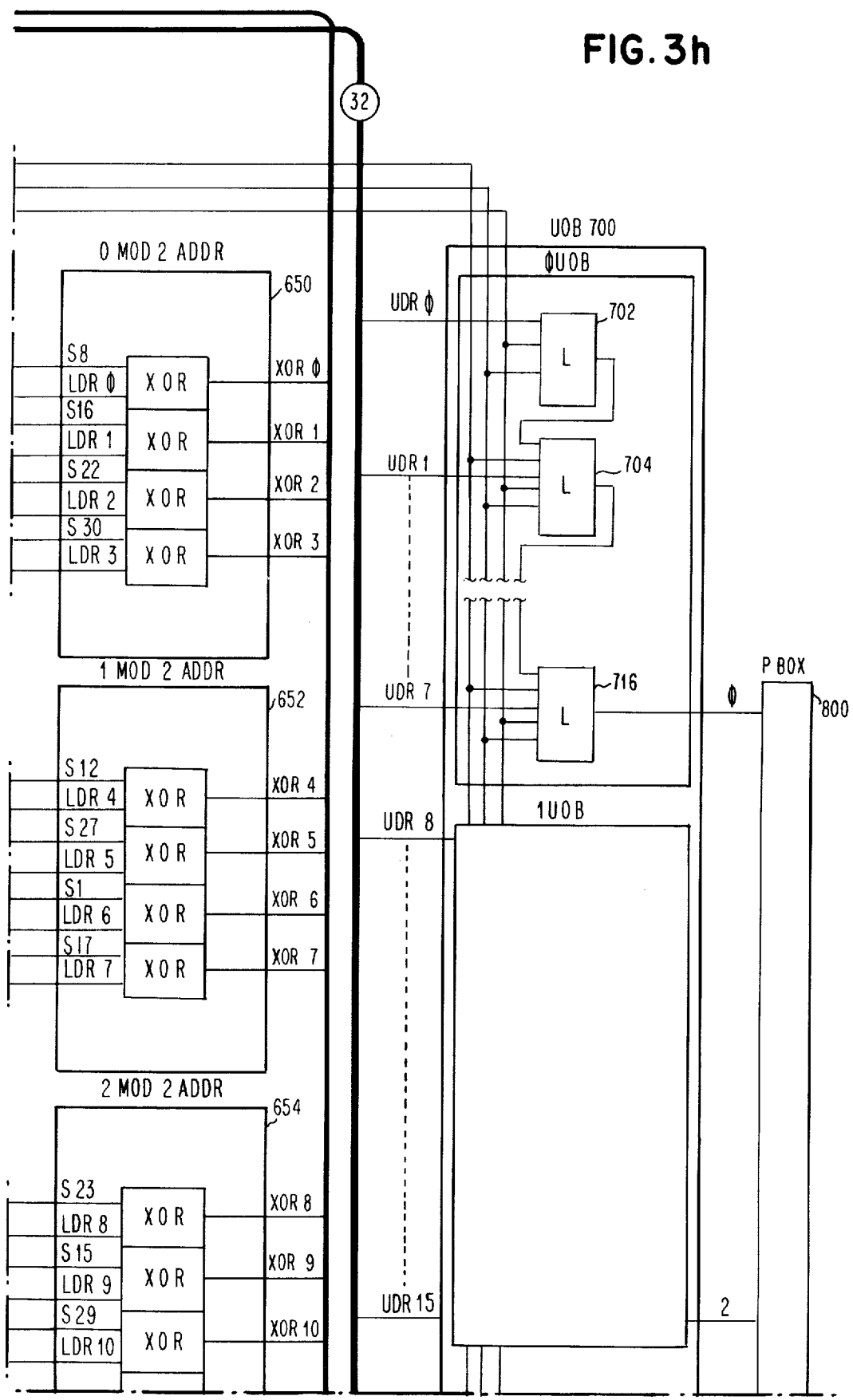
Figure 3I:
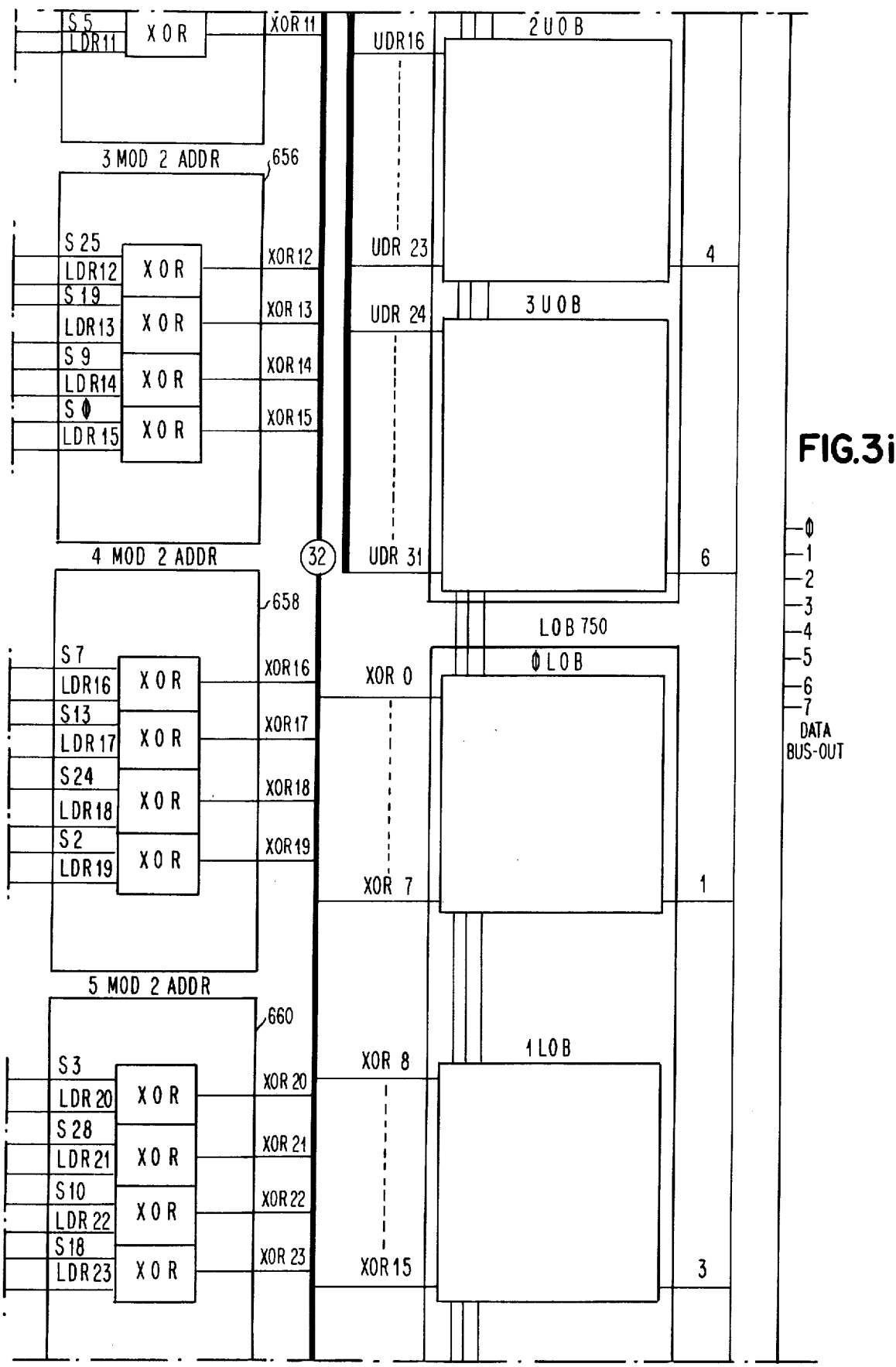

Referring now to FIGS. 3h, 3i and 3j, the eight modulo-2 adders 650, 652, 654, 656, 658, 660, 662 and 664, each consists of four exclusive OR's. The second half of the message block contained in LDR 250 consisting of 32 data bits considered as eight 4-bit data segments, together with the permuted substitution set of 32 bits representing the product block cipher of the first half of the message block, are applied as inputs to the eight modulo-2 adders 650 to 664. The eight modulo-2 adders 650 to 664 effectively modify the 32 data bits of the second half of the message block in parallel with the 32-bit product block cipher of the first half of the message block producing eight 4-bit segments forming a new set of 32 bits representing the modified second half of the message block which is applied via a bus to the UDR 200 in FIG. 3a.

Referring now to FIG. 3a and the timing diagram in FIG. 7a, during the first part of cycle 10, first signals are applied to the LB and $\overline{\text{LDR}}$ lines which are connected to all of the latches in the UDR 200 permitting the new set of 32 bits representing the modified second half of the message block to be stored in the UDR 200. At the same time, the signals on the LB and $\overline{\text{LDR}}$ lines are also applied to all of the latches of the LDR 250 permitting the first half of the message block presently stored in the UDR 200 to be transferred to and stored in the latches of the LDR 250. This transposing of the now modified second half of the message block and the first half of the message block is in preparation for carrying out the next iteration operation of the enciphering process. At this point, the first iteration operation of the enciphering process that was started after the preshift of the cipher key in cycle 8 is completed.

Referring now to FIGS. 3a to 3j and the timing diagram of FIG. 7a, the second iteration operation of the enciphering process is carried out during cycles 10, 11 and 12 and is initiated by a shifting operation performed during cycle 10. During cycle 10, second signals on the SL and $\overline{\text{LDR}}$ lines applied to all stages of UKR 350 and LKR 400 cause another 1 bit position shift up of the cipher key in accordance with the cipher key shift schedule. This provides a second set of cipher key bits for the second iteration operation of the enciphering process. During cycle 11, the modified second half of the message block presently stored in UDR 200 is then used in a similar product block cipher operation, as described above, the result of which is used by the modulo-2 adders 650 to 664 to modify the first half of the message block presently stored in LDR 250.

Referring now to FIG. 3a and the timing diagram in FIG. 7a, during cycle 12, second signals are applied to the LB and $\overline{\text{LDR}}$ lines which being connected to all the latches in UDR 200 permit the next new set of 32 bits representing the modified first half of the message block to be stored in UDR 200. At the same time, the second signals on the LB and $\overline{\text{LDR}}$ lines are also applied to all latches of LDR 250 permitting the modified second half of the message block presently stored in UDR 200 to be transferred to and stored in LDR 250. This operation prepares the cipher device to carry out the next iteration of the enciphering process. At this point, the second iteration operation of the enciphering operation is completed.

Referring now to the cipher key shift schedule in Table 5, it should be noted that the cipher key must be shifted 2 bit positions during the third iteration operation of the enciphering process which is carried out during cycles 11, 12, 13 and 14. Accordingly, during cycle 11, the first of the two shift operations of the cipher key is performed by applying third signals to the SL and $\overline{\text{LDR}}$ lines. This initiates the first of the two shifts for the third iteration operation and because of the resolving time through the cipher device has no effect on the second iteration operation which was initiated by the second signal applied to the SL line. During cycle 12, fourth signals applied to the SL and $\overline{\text{LDR}}$ lines cause the cipher key to be shifted up another 1 bit position. Thus, the cipher key is shifted 2 bit positions by the third and fourth signals applied to the SL and $\overline{\text{LDR}}$ lines during the third iteration operation.

In a similar manner, and in accordance with the cipher key shift schedule, successive iteration operations of the enciphering process are carried out by the cipher device. During each of the remaining iteration operations of the enciphering process except the last, the cipher key bits in UKR 350 and LKR 400 are shifted according to the predetermined shift schedule, a modified half of the message block stored in LDR 250 is remodified according to a product block cipher of the previously modified half of the message block stored in UDR 200 and the resulting remodified half of a message block from the modulo-2 adders 650 to 664 is applied to replace the previously modified half of the message block contained in UDR 200 which at the same time is transferred to replace the contents of LDR 250. During the last iteration operation of the enciphering process, performed during cycles 28 and 39, the cipher key bits in UKR 350 and LKR 400 are shifted a last time according to the shift schedule and a last remodification of a modified half of the message block stored in LDR 250 is performed according to a product block cipher of the previously modified half of the message block stored in UDR 200 but the resulting remodified half of the message block from the modulo-2 adders 650 to 664 and the previously modified half of the message block stored in UDR 200 are not transposed due to the absence of a signal on the LB line and now constitute the encipher version of the original message block. Consequently, referring to FIGS. 3a, 3h, 3i and 3j, the 32-bit output of the UDR 200 and the 32-bit output of the modulo-2 adders 650 to 664, representing the 64-bit enciphered version of the original message block, are applied to the UOB 700 and the LOB 750, respectively. The UOB 700 and LOB 750 each consists of four 8-stage shift registers 0UOB, 1UOB, 2UOB, 3UOB and 0LOB, 1LOB, 2LOB, 3LOB. The first, second and last stages of the first shift register 0UOB are shown in detail in FIG. 3h with the remaining shift registers being shown in block form inasmuch as they are identical in detail to that of the shift register 0UOB.

Referring now to FIGS. 3h, 3i and 3j and the timing diagram of FIG. 7b, during cycle 40, signals are applied to the LDOB and $\overline{\text{LDOB}}$ lines which are connected to all of the latches in each of the shift registers of the UOB 700 and LOB 750 such as latches 702, 704 and 716 in shift register UOB. Accordingly, these signals are effective to cause a parallel transfer of the 32-bit output of the UDR 200 to the UOB 700 and a concurrent parallel transfer of the 32-bit output of the modulo-2 adders 650 to 664 to the LOB 750.

The 64-bit enciphered block of data now stored in UOB 700 and LOB 750 is subjected to a parallel to serial conversion, an 8-bit byte at a time, with the bit content of the last stage of each of the eight registers being applied as an 8-bit byte to the P box 800 where each 8-bit byte is subjected to a final linear permutation to connect the enciphered data bits to the proper bit lines of the data bus-out. This is accomplished by the application of signals on the DOB and $\overline{\text{LDOB}}$ lines to the second to the eighth stages of each of the eight shift registers 0UOB, 1UOB, 2UOB 3UOB and 0LOB, 1LOB, 2LOB, 3LOB. Thus, during each of the cycles 41 to 47 the data bits in each of the eight shift registers are shifted down by one position and an 8-bit byte of data is permuted via the P box 800 to the data bus-out. At the end of cycle 48, the last byte of the 64-bit enciphered block of data is transmitted and the enciphering process is completed.

While it is not shown in the timing diagram of FIGS. 7a and 7b, it should be apparent that successive message blocks of data may be enciphered in a similar manner. Accordingly, during the enciphering of the first message block of data, if the next message block of data is received by the cipher device, it may be loaded into the UIB 100 and LIB 150. Then, at the end of cycle 39, when the last iteration of the first enciphering process is completed, the ciphering key has made a complete revolution through the UKR 350 and LKR 400 and is back to its original format in preparation for controlling the enciphering of the next message block of data. Therefore, during cycle 40 of the first enciphering operation, while the enciphered first message block of data is being transferred to UOB 700 and LOB 750, the next message block of data may be transferred to UDR 200 and LDR 250 under control of signals applied to the IBT and $\overline{\text{LDR}}$ lines, shown in dotted form in FIG. 7b, and the next enciphering process may proceed while the first message block of data is being transferred from UOB 700 and LOB 750 via P box 800 to the data bus-out. It should be apparent that if the rate of message block transmission to the cipher device becomes too high, so that a succeeding message block of data is received before the preceding message block of data has been transferred from the input buffers to the data registers, then circuitry will have to be provided to indicate this condition, e.g., a busy signal. This will permit succeeding blocks of data to be transmitted synchronously at the operating speed of the cipher device.

DECIPHERING PROCESS

A deciphering process using a cipher device of the present invention to decipher a 64-bit enciphered message block of data is accomplished under control of the same cipher key as is used in the enciphering process through the same series of 16 iterations. However, in the deciphering process the cipher key is postshifted after the last iteration operation rather than preshifted before the first iteration operation as in the case of the enciphering process. Additionally, the cipher key is shifted in a direction opposite to that of the enciphering process according to the predetermined shift schedule shown in Table 5. This assures proper alignment of the cipher key bits during the deciphering iterations to undo every iteration that was carried out in the enciphering process and produce a resulting 64-bit message block identical with the original message block.

Referring now to FIGS. 3a to 3d and the timing diagram in FIG. 7a, during cycles 0 to 7 the enciphered message block of data is received via the data bus-in, buffered in UIB 100 and LIB 150 and the cipher key is received and loaded into UKR 350 and LKR 400, in a manner as previously described. During cycle 8, the enciphered message block is transferred in parallel from the UIB 100 and LIB 150 to the UDR 200 and LDR 250, respectively, as previously described. Referring now to FIGS. 3a to 3j, during cycle 9, a first half of the enciphered message block presently stored in UDR 200 is used with a permuted set of the cipher key bits in a product block cipher operation, the result of which is used by the modulo-2 adders 650 to 664 to modify the second half of the message block presently stored in LDR 250 in a similar manner to that described in the enciphering process. Referring now to FIG. 7a, during cycle 10, the first signal applied to the LB line and the signal applied to the LDR line permit the modified second half of the enciphered message block to replace the first half of the enciphered message block in UDR 200 which at the same time replaces the second half of the enciphered message in LDR 250 in preparation for the next iteration operation of the deciphering process.

The second iteration operation of the deciphering process is carried out during cycles 10, 11 and 12 and is initiated by shifting the cipher key bits down one bit position during cycle 10. This is accomplished by the first signal on the SRR line applied to the first stages of the UKR 350 and LKR 400, the first signal on the SR line applied to the remaining stages of each of the UKR 350 and LKR 400 and the signal on the LDK line applied to all stages of the UKR 350 and the LKR 400. The first signal on the SRR line together with the signal on the LDK line causes the bit content of the last stage of each of the UKR 350 and LKR 400 to be transferred up to the first stage of each of these registers while the first signal on the SR line together with the signal on the LDK line, which are applied to all of the remaining stages of the UKR 350 and LKR 400, causes the bit content of each stage of these registers to be transferred down to the succeeding stage thereby providing a one bit position shift down of the entire cipher key. This provides a new set of cipher key bits for the second iteration of the deciphering process which is completed by the end of cycle 12 in a similar manner to that described for the enciphering process.

Referring now to the cipher key shift schedule in Table 5, it should be noted that the cipher key must be shifted 2 bit positions at the beginning of the third iteration of the deciphering process. Accordingly, during cycle 11, the first of the two shift operations of the cipher key is performed by applying second signals to the SRR and SR lines and a signal to the LDK line. During cycle 12 third signals are applied to the SRR and SR lines and another signal to the LDK line causing the cipher key to be shifted down two bit positions by the second and third signals applied to the SRR and SR lines. In a similar manner, and in accordance with the cipher key shift schedule, successive iteration operations of the deciphering process are carried out by the cipher device which are completed by the end of cycle 30, except that in the 16th iteration the absence of a signal on the LB line inhibits the transposing operation similar to that described in the 16th iteration of the enciphering operation. During cycle 40, a postshift operation of the cipher key is performed to complete a full revolution of the cipher key through the UKR 350 and LKR 400 back to its original format in preparation for controlling the deciphering of the next message block of data. Then, during cycles 40 to 48 the deciphered message block of data is parallel transferred from the output of the UDR 200 and the modulo-2 adders 650 to 664 to the UOB 700 and LOB 750, respectively, and then transferred, an 8-bit byte at a time, via the P box 800 to the data bus-out. At the end of cycle 48, the last byte of the 64-bit deciphered block of data is transmitted and the deciphering process is completed. While it is not shown in the timing diagrams of FIGS. 7a and 7b, it should be apparent that successive enciphered message blocks of data may be deciphered in a similar manner. It should also be apparent by those skilled in the art that the modulo-2 addition performed by the modulo-2 adders 650 to 664 during enciphering is a self-reversing process which occurs during the deciphering process.

While the invention has shown a series of modulo-2 adders 500 to 514, it should be apparent by those skilled in the art that the product block cipher operation need not be restricted to the use of such modulo-2 adders only, but that any type adder or combination of adders may be used provided a 48-bit output is produced.

While the invention has been particularly shown and described with reference to the preferred embodiment hereof, it will be understood by those skilled in the art that several changes in form and detail may be made without departing from the spirit and scope of the invention.

What is claimed is:

1. A device for performing a product block cipher operation on a block of data bits under control of a set of cipher key bits comprising:

first store means storing said block of data bits, first linear transformation means permuting said set of cipher key bits, means connected to said first store means duplicating predetermined ones of the data bits of said block of data bits to produce ann expanded block of data bits equal in number to the number of said permuted cipher key bits, means connected to said expansion means and said first linear transformation means carrying out a substitution transformation function in accordance with said expanded block of data bits and said permuted cipher key bits to produce a substitution set of bits equal in number to the number of bits in said block of data, and second linear transformation means connected to said substitution transformation means permuting said substitution set of bits whereby the combined transformation results in a product block cipher of said block of data bits.

2. A cipher device as defined in claim 1 wherein said expansion means duplicates half of the data bits of said block of data bits.

3. A cipher device as defined in claim 1 wherein said substitution transformation means comprises:
   means combining the data bits of said expanded block of data bits and said permuted cipher key bits to produce a combined set of bits, and
   nonlinear transformation means connected to said combining means carrying out a nonlinear substitution transformation function of said combined set of bits to produce said substitution set of bits.

4. A device for performing a product block cipher operation on a block of data bits under control of a set of cipher key bits comprising:
   first store means storing said block of data bits,
   first linear transformation means permuting said set of cipher key bits,
   said permuted cipher key bits being grouped into a plurality of permuted cipher key bit segments,
   means connected to said first store means duplicating predetermined ones of the data bits of said block of data bits to produce an expanded block of data bits equal in number to the number of said permuted cipher key bits,
   said expanded block of data bits being grouped into a plurality of data bit segments equal in number to said plurality of permuted cipher key bit segments,
   a plurality of substitution transformation means responsive to said plurality of data bit segments and said plurality of permuted cipher key bit segments carrying out different substitution transformation functions to produce a substitution set of bits equal in number to the number of bits in said block of data bits, and
   second linear transformation means connected to said plurality of substitution transformation means permuting said substitution set of bits whereby the combined transformation results in a product block cipher of said block of data bits.

5. A cipher device as defined in claim 4 wherein said plurality of substitution transformation means comprises:
   a plurality of adders combining said plurality of data bit segments and said plurality of permuted cipher key bit segments to produce a plurality of combined bit segments, and
   a plurality of nonlinear transformation means connected to said plurality of adders carrying out a plurality of different nonlinear substitution transformation functions of said plurality of combined bit segments to produce said substitution set of bits.

6. A cipher device as defined in claim 5 wherein said plurality of data bit segments consist of different groups of data bits the outer ones of each group comprising the duplicated predetermined ones of the data bits of said block of data bits.

7. A cipher device as defined in claim 6 wherein said plurality of permuted cipher key segments consist of different groups of permuted cipher key bits and said plurality of adders comprises:
   subgroups of adders combining said groups of data bits and said groups of permuted cipher key bits to produce subgroups of combined bits, and
   said plurality of nonlinear transformation means comprising subgroups of nonlinear transformation means connected to said subgroups of adders for carrying out a plurality of different nonlinear substitution transformation functions of said subgroups of combined bits to produce subgroups of substitution set of bits, the outer ones of the combined bits of each subgroup of combined bits being effective to select one nonlinear transformation means in each of said subgroup of nonlinear transformation means.

8. A device for performing a product block cipher operation on a block of 32 data bits under control of a set of 48 cipher key bits comprising:
   first store means storing said block of 32 data bits,
   first linear transformation means permuting said set of 48 cipher key bits,
   means connected to said first store means duplicating 16 predetermined ones of the data bits of said block of 32 data bits to produce an expanded block containing 48 data bits,
   means connected to said expansion means and said first linear transformation means carrying out a many to one substitution transformation function in accordance with said expanded block of 48 data bits and said 48 permuted cipher key bits to produce a substitution set of 32 bits, and
   second linear transformation means connected to said substitution transformation means permuting said substitution set of 32 bits, whereby the combined transformation results in a product block cipher of said block of 32 data bits.

9. A process for product block ciphering a block of data represented by a combination of binary digits under control of a cipher key represented by a combination of binary digits comprising the steps of:
   a. storing said block of data bits in a first store means,
   b. linearly transforming said cipher key by rearranging a portion of said cipher key combination of binary digits,
   c. duplicating predetermined ones of the data bits of said block of data bits to provide an expanded block of data bits consisting of said duplicated data bits and said block of data bits,
   said expanded block of data bits being equal in number to the number of said transformed cipher key bits,
   d. carrying out a substitution transformation function in accordance with said expanded block of data bits and said transformed cipher key bits to produce a substitution set of bits represented by a combination of binary digits equal in number to the number of bits in said block of data, and
   e. linearly transforming said substitution set of bits by rearranging said substitution combination of binary digits,
   whereby the combined transformation results in a product block cipher of said block of data bits.

10. A process for product block ciphering a block of data bits under control of a set of cipher key bits comprising the steps of:
   a. storing said block of data bits in a first store means,
   b. linearly transforming said set of cipher key bits into a plurality of transformed cipher key bit segments,
   c. duplicating predetermined ones of the data bits of said block of data bits to provide an expanded block of data bits consisting of said duplicated data bits and said block of data bits grouped into a plurality of data bit segments equal in number to said plurality of transformed cipher key bit segments,
   d. carrying out a plurality of different substitution transformation functions in accordance with said plurality of data bit segments and said plurality of transformed cipher key segments to produce a substitution set of bits equal in number to the number of bits in said block of data bits, and
   e. linearly transforming said substitution set of bits, whereby the combined transformation results in a product block cipher of said block of data bits.

* * * * *